(12) United States Patent
Elliot et al.

(10) Patent No.: US 10,437,612 B1
(45) Date of Patent: Oct. 8, 2019

(54) COMPOSITE GRAPHICAL INTERFACE WITH SHAREABLE DATA-OBJECTS

(71) Applicant: Palantir Technologies Inc., Palo Alto, CA (US)

(72) Inventors: Mark Elliot, New York City, NY (US); Brian Schimpf, Vienna, VA (US); Timothy Slatcher, London (GB); Ashwin Ramaswamy, New York City, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 386 days.

(21) Appl. No.: 15/423,380

(22) Filed: Feb. 2, 2017

Related U.S. Application Data

(63) Continuation of application No. 15/139,793, filed on Apr. 27, 2016, now Pat. No. 9,612,723.
(Continued)

(51) Int. Cl.
*G06F 3/0482* (2013.01)
*G06F 9/451* (2018.01)
*G06F 3/0481* (2013.01)

(52) U.S. Cl.
CPC ............ *G06F 9/451* (2018.02); *G06F 3/0482* (2013.01); *G06F 3/04817* (2013.01)

(58) Field of Classification Search
CPC ..................................................... G06F 3/0482
(Continued)

(56) References Cited

U.S. PATENT DOCUMENTS 5,109,399 A  4/1992 Thompson
5,329,108 A  7/1994 Lamoure
(Continued)

FOREIGN PATENT DOCUMENTS

DE  102014103482 A1  9/2014
DE  102014215621 A1  2/2015
(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.
(Continued)

*Primary Examiner* — Reza Nabi
(74) *Attorney, Agent, or Firm* — Schwegman Lundberg & Woessner, P.A.

(57) ABSTRACT

Aspects of the present disclosure involve receiving references to application data of applications hosted by the servers. The application data includes information defining an interface of the application (e.g., a set of interface elements), and data types associated with the application. As a part of the process for generating a composite graphical user interface (GUI), the composite interface system receives references to application data of one or more applications at various memory locations (e.g., at both local and third-party servers). In this way, the composite interface system accesses the application data of any referenced application in order to retrieve application data to configure a composite GUI which includes interface elements of each of the referenced application.

17 Claims, 9 Drawing Sheets

Related U.S. Application Data

(60) Provisional application No. 62/273,320, filed on Dec. 30, 2015.

(58) Field of Classification Search
USPC .......................................................... 715/762
See application file for complete search history.

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer et al. |
| 6,057,757 A | 5/2000 | Arrowsmith et al. |
| 6,091,956 A | 7/2000 | Hollenberg |
| 6,161,098 A | 12/2000 | Wallman |
| 6,190,053 B1 | 2/2001 | Stahlecker et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka |
| 7,139,800 B2 | 11/2006 | Bellotti et al. |
| 7,158,878 B2 | 1/2007 | Rasmussen |
| 7,162,475 B2 | 1/2007 | Ackerman |
| 7,168,039 B2 | 1/2007 | Bertram |
| 7,171,427 B2 | 1/2007 | Witkowski et al. |
| 7,174,377 B2 | 2/2007 | Bernard et al. |
| 7,216,088 B1 * | 5/2007 | Chappel .......... G06Q 10/063118 705/7.17 |
| 7,269,786 B1 | 9/2007 | Malloy et al. |
| 7,278,105 B1 | 10/2007 | Kitts et al. |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams, Jr. et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quaterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,655,687 B2 | 2/2014 | Zizzamia et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy, Sr. et al. |
| 8,744,890 B1 | 6/2014 | Bernier et al. |

(56) References Cited

U.S. PATENT DOCUMENTS

| | | |
|---|---|---|
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | SIngh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,116,975 B2 | 8/2015 | Shankar et al. |
| 9,612,723 B1 | 4/2017 | Elliot et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller et al. |
| 2002/0095658 A1 | 7/2002 | Shulman et al. |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205656 A1* | 10/2004 | Reulein ............... G06F 17/2247 715/255 |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell et al. |
| 2005/0086207 A1 | 4/2005 | Heuer et al. |
| 2005/0114361 A1 | 5/2005 | Roberts et al. |
| 2005/0125715 A1 | 6/2005 | Di Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0289109 A1* | 12/2005 | Arrouye ............... G06F 16/248 |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel et al. |
| 2006/0149596 A1 | 7/2006 | Surpin et al. |
| 2006/0203337 A1 | 9/2006 | White |
| 2006/0218163 A1 | 9/2006 | Marcjan et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0047439 A1* | 3/2007 | An ....................... G06Q 10/063 370/231 |
| 2007/0057966 A1 | 3/2007 | Ohno et al. |
| 2007/0078832 A1 | 4/2007 | Ott, IV et al. |
| 2007/0083541 A1* | 4/2007 | Fraleigh ............... G06F 17/245 |
| 2007/0094256 A1* | 4/2007 | Hite .................... G06F 17/2785 |
| 2007/0094389 A1 | 4/2007 | Nussey et al. |
| 2007/0150369 A1 | 6/2007 | Zivin |
| 2007/0174760 A1* | 7/2007 | Chamberlain ........ G06F 17/246 715/220 |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2008/0016216 A1 | 1/2008 | Worley et al. |
| 2008/0033919 A1* | 2/2008 | Arrouye ............... G06F 16/248 |
| 2008/0040684 A1 | 2/2008 | Crump et al. |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone |
| 2008/0082486 A1 | 4/2008 | Lermant et al. |
| 2008/0091808 A1* | 4/2008 | Mei ...................... H04L 67/025 709/223 |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0195417 A1 | 8/2008 | Surpin |
| 2008/0195608 A1 | 8/2008 | Clover |
| 2008/0222295 A1 | 9/2008 | Robinson et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313175 A1* | 12/2008 | Kersten ................ G06Q 10/06 |
| 2009/0002492 A1 | 1/2009 | Velipasalar et al. |
| 2009/0007088 A1* | 1/2009 | Fischer ................. G06F 8/60 717/165 |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1* | 4/2009 | Schaaf ................ G01C 21/367 701/532 |
| 2009/0119309 A1* | 5/2009 | Gibson ................. G06Q 10/10 |
| 2009/0119638 A1* | 5/2009 | Li ......................... G06F 8/20 717/101 |
| 2009/0125359 A1* | 5/2009 | Knapic .................. G06F 9/542 705/7.23 |

(56) References Cited

U.S. PATENT DOCUMENTS

| | | | |
|---|---|---|---|
| 2009/0125369 A1* | 5/2009 | Kloostra | G06Q 10/00 705/35 |
| 2009/0125459 A1* | 5/2009 | Norton | G06N 5/025 706/10 |
| 2009/0132921 A1* | 5/2009 | Hwangbo | G06F 3/0482 715/716 |
| 2009/0132953 A1* | 5/2009 | Reed, Jr. | G06F 3/0481 715/781 |
| 2009/0143052 A1* | 6/2009 | Bates | H04M 3/4931 455/414.2 |
| 2009/0144262 A1* | 6/2009 | White | G06F 16/242 |
| 2009/0144274 A1 | 6/2009 | Fraleigh et al. | |
| 2009/0164934 A1* | 6/2009 | Bhattiprolu | G06F 3/0483 715/777 |
| 2009/0171939 A1* | 7/2009 | Athsani | G06F 16/29 |
| 2009/0172511 A1* | 7/2009 | Decherd | G06F 16/9537 715/207 |
| 2009/0172821 A1* | 7/2009 | Daira | G06F 21/55 726/27 |
| 2009/0177962 A1* | 7/2009 | Gusmorino | G06F 16/26 715/243 |
| 2009/0179892 A1* | 7/2009 | Tsuda | G06F 3/04817 345/419 |
| 2009/0187464 A1* | 7/2009 | Bai | G06Q 10/04 705/7.34 |
| 2009/0222400 A1* | 9/2009 | Kupershmidt | G06N 20/00 706/52 |
| 2009/0222759 A1* | 9/2009 | Drieschner | G06F 16/907 715/780 |
| 2009/0222760 A1* | 9/2009 | Halverson | G06F 17/245 715/781 |
| 2009/0234720 A1* | 9/2009 | George | G06Q 10/06 705/7.42 |
| 2009/0249244 A1 | 10/2009 | Robinson et al. | |
| 2009/0254970 A1* | 10/2009 | Agarwal | G06F 21/554 726/1 |
| 2009/0281839 A1* | 11/2009 | Lynn | G06F 19/321 705/3 |
| 2009/0287470 A1* | 11/2009 | Farnsworth | G06F 17/27 704/3 |
| 2009/0292626 A1* | 11/2009 | Oxford | G06Q 30/06 705/26.1 |
| 2010/0011282 A1* | 1/2010 | Dollard | G06F 17/241 715/233 |
| 2010/0042922 A1* | 2/2010 | Bradateanu | G06F 16/2428 715/711 |
| 2010/0057716 A1* | 3/2010 | Stefik | G06F 16/355 707/E17.108 |
| 2010/0070523 A1* | 3/2010 | Delgo | G11B 27/28 707/769 |
| 2010/0070842 A1 | 3/2010 | Aymeloglu et al. | |
| 2010/0070845 A1* | 3/2010 | Facemire | G06F 17/241 715/230 |
| 2010/0070897 A1* | 3/2010 | Aymeloglu | G06F 17/2288 715/765 |
| 2010/0100963 A1* | 4/2010 | Mahaffey | G06F 21/564 726/25 |
| 2010/0103124 A1* | 4/2010 | Kruzeniski | G06F 3/0482 345/173 |
| 2010/0114887 A1* | 5/2010 | Conway | G06F 3/0237 707/737 |
| 2010/0122152 A1 | 5/2010 | Chamberlain et al. | |
| 2010/0131457 A1* | 5/2010 | Heimendinger | G06F 16/283 707/602 |
| 2010/0162176 A1 | 6/2010 | Dunton | |
| 2010/0191563 A1* | 7/2010 | Schlaifer | G06Q 10/06 705/7.36 |
| 2010/0198684 A1* | 8/2010 | Eraker | G06Q 30/02 705/14.49 |
| 2010/0199225 A1 | 8/2010 | Coleman et al. | |
| 2010/0228812 A1* | 9/2010 | Uomini | G06Q 10/00 709/203 |
| 2010/0250412 A1* | 9/2010 | Wagner | G06Q 40/02 705/31 |
| 2010/0280857 A1* | 11/2010 | Liu | G06Q 10/087 707/600 |
| 2010/0293174 A1* | 11/2010 | Bennett | G06F 16/353 707/759 |
| 2010/0306713 A1* | 12/2010 | Geisner | G06F 3/017 715/863 |
| 2010/0313119 A1* | 12/2010 | Baldwin | G06F 17/248 715/256 |
| 2010/0318924 A1* | 12/2010 | Frankel | G06Q 10/06 715/752 |
| 2010/0321399 A1* | 12/2010 | Ellren | G06F 16/29 345/587 |
| 2010/0325526 A1* | 12/2010 | Ellis | G06F 17/246 715/217 |
| 2010/0325581 A1* | 12/2010 | Finkelstein | G06F 16/954 715/810 |
| 2010/0330801 A1 | 12/2010 | Rouh | |
| 2011/0029526 A1* | 2/2011 | Knight | G06N 5/02 707/737 |
| 2011/0047159 A1* | 2/2011 | Baid | G06F 16/355 707/738 |
| 2011/0060753 A1* | 3/2011 | Shaked | G06F 16/2477 707/769 |
| 2011/0061013 A1* | 3/2011 | Bilicki | G06Q 10/06 715/771 |
| 2011/0066933 A1* | 3/2011 | Ludwig | G06F 17/246 715/212 |
| 2011/0074811 A1* | 3/2011 | Hanson | G06T 11/00 345/629 |
| 2011/0078055 A1* | 3/2011 | Faribault | G06Q 30/02 705/27.2 |
| 2011/0078173 A1* | 3/2011 | Seligmann | G06Q 10/10 707/769 |
| 2011/0093327 A1* | 4/2011 | Fordyce, III | G06Q 20/10 705/14.39 |
| 2011/0117878 A1* | 5/2011 | Barash | H04W 4/90 455/404.2 |
| 2011/0119100 A1* | 5/2011 | Ruhl | G06Q 10/06 705/7.11 |
| 2011/0137766 A1* | 6/2011 | Rasmussen | G01C 21/32 705/30 |
| 2011/0153384 A1* | 6/2011 | Horne | G06Q 30/0201 705/7.29 |
| 2011/0161096 A1* | 6/2011 | Buehler | G06Q 10/00 705/2 |
| 2011/0167105 A1* | 7/2011 | Ramakrishnan | G06Q 10/10 709/203 |
| 2011/0170799 A1* | 7/2011 | Carrino | G06T 17/05 382/285 |
| 2011/0173032 A1* | 7/2011 | Payne | G06Q 10/02 705/5 |
| 2011/0185316 A1* | 7/2011 | Reid | G06F 3/0486 715/863 |
| 2011/0208724 A1* | 8/2011 | Jones | G06Q 30/0205 707/723 |
| 2011/0213655 A1* | 9/2011 | Henkin | G06Q 30/00 705/14.49 |
| 2011/0218934 A1* | 9/2011 | Elser | G06Q 40/02 705/36 R |
| 2011/0219450 A1* | 9/2011 | McDougal | G06F 21/56 726/23 |
| 2011/0225198 A1* | 9/2011 | Edwards | G06Q 10/00 707/780 |
| 2011/0238495 A1* | 9/2011 | Kang | G06Q 30/02 705/14.49 |
| 2011/0238553 A1* | 9/2011 | Raj | G06Q 20/10 705/37 |
| 2011/0251951 A1* | 10/2011 | Kolkowitz | G06Q 20/10 705/39 |
| 2011/0258158 A1* | 10/2011 | Resende, Jr. | G06F 16/24532 707/608 |
| 2011/0270705 A1* | 11/2011 | Parker | G06Q 30/0603 705/26.61 |

(56) References Cited

U.S. PATENT DOCUMENTS

| | | | |
|---|---|---|---|
| 2011/0289397 A1* | 11/2011 | Eastmond | G06F 3/0485 715/212 |
| 2011/0289420 A1* | 11/2011 | Morioka | G06Q 30/06 715/738 |
| 2011/0291851 A1* | 12/2011 | Whisenant | G08B 25/14 340/686.1 |
| 2011/0310005 A1* | 12/2011 | Chen | G06F 1/3203 345/156 |
| 2011/0314007 A1* | 12/2011 | Dassa | G06F 16/24578 707/723 |
| 2012/0019559 A1* | 1/2012 | Siler | G06T 11/206 345/634 |
| 2012/0036013 A1* | 2/2012 | Neuhaus | G06Q 30/02 705/14.53 |
| 2012/0036434 A1* | 2/2012 | Oberstein | G06F 3/0482 715/702 |
| 2012/0050293 A1 | 3/2012 | Carlhian et al. | |
| 2012/0066296 A1 | 3/2012 | Appleton et al. | |
| 2012/0072825 A1 | 3/2012 | Sherkin et al. | |
| 2012/0079363 A1 | 3/2012 | Folting et al. | |
| 2012/0084118 A1 | 4/2012 | Bai et al. | |
| 2012/0106801 A1 | 5/2012 | Jackson | |
| 2012/0117082 A1 | 5/2012 | Koperda et al. | |
| 2012/0124547 A1* | 5/2012 | Halbedel | G06F 16/903 717/100 |
| 2012/0131512 A1 | 5/2012 | Takeuchi et al. | |
| 2012/0137235 A1 | 5/2012 | Ts et al. | |
| 2012/0144335 A1 | 6/2012 | Abeln et al. | |
| 2012/0159307 A1 | 6/2012 | Chung et al. | |
| 2012/0159362 A1 | 6/2012 | Brown et al. | |
| 2012/0159399 A1 | 6/2012 | Bastide et al. | |
| 2012/0170847 A1 | 7/2012 | Tsukidate | |
| 2012/0173985 A1 | 7/2012 | Peppel | |
| 2012/0180002 A1 | 7/2012 | Campbell et al. | |
| 2012/0196557 A1 | 8/2012 | Reich et al. | |
| 2012/0196558 A1 | 8/2012 | Reich et al. | |
| 2012/0197651 A1 | 8/2012 | Robinson et al. | |
| 2012/0203708 A1 | 8/2012 | Psota et al. | |
| 2012/0208636 A1 | 8/2012 | Feige | |
| 2012/0221511 A1 | 8/2012 | Gibson et al. | |
| 2012/0221553 A1 | 8/2012 | Wittmer et al. | |
| 2012/0221580 A1 | 8/2012 | Barney | |
| 2012/0245976 A1 | 9/2012 | Kumar et al. | |
| 2012/0246148 A1 | 9/2012 | Dror | |
| 2012/0254129 A1 | 10/2012 | Wheeler et al. | |
| 2012/0284345 A1 | 11/2012 | Costenaro et al. | |
| 2012/0290879 A1 | 11/2012 | Shibuya et al. | |
| 2012/0296907 A1 | 11/2012 | Long et al. | |
| 2012/0311684 A1 | 12/2012 | Paulsen et al. | |
| 2012/0323888 A1 | 12/2012 | Osann, Jr. | |
| 2012/0330801 A1 | 12/2012 | Mcdougal et al. | |
| 2012/0330973 A1 | 12/2012 | Ghuneim et al. | |
| 2013/0006426 A1 | 1/2013 | Healey et al. | |
| 2013/0006725 A1 | 1/2013 | Simanek et al. | |
| 2013/0006916 A1 | 1/2013 | Mcbride et al. | |
| 2013/0018796 A1 | 1/2013 | Kolhatkar et al. | |
| 2013/0024268 A1 | 1/2013 | Manickavelu | |
| 2013/0046635 A1 | 2/2013 | Grigg et al. | |
| 2013/0046842 A1 | 2/2013 | Muntz et al. | |
| 2013/0060786 A1 | 3/2013 | Serrano et al. | |
| 2013/0061169 A1 | 3/2013 | Pearcy | |
| 2013/0073377 A1 | 3/2013 | Heath | |
| 2013/0073454 A1 | 3/2013 | Busch | |
| 2013/0078943 A1 | 3/2013 | Biage et al. | |
| 2013/0086482 A1 | 4/2013 | Parsons | |
| 2013/0097482 A1 | 4/2013 | Marantz et al. | |
| 2013/0110822 A1 | 5/2013 | Ikeda et al. | |
| 2013/0110877 A1 | 5/2013 | Bonham et al. | |
| 2013/0111320 A1 | 5/2013 | Campbell et al. | |
| 2013/0117651 A1 | 5/2013 | Waldman et al. | |
| 2013/0150004 A1 | 6/2013 | Rosen | |
| 2013/0151148 A1 | 6/2013 | Parundekar et al. | |
| 2013/0151388 A1 | 6/2013 | Falkenborg et al. | |
| 2013/0157234 A1 | 6/2013 | Gulli et al. | |
| 2013/0166550 A1 | 6/2013 | Buchmann et al. | |
| 2013/0176321 A1 | 7/2013 | Mitchell et al. | |
| 2013/0179420 A1 | 7/2013 | Park et al. | |
| 2013/0224696 A1 | 8/2013 | Wolfe et al. | |
| 2013/0225212 A1 | 8/2013 | Khan | |
| 2013/0226318 A1 | 8/2013 | Procyk et al. | |
| 2013/0226953 A1 | 8/2013 | Markovich et al. | |
| 2013/0232045 A1 | 9/2013 | Tai et al. | |
| 2013/0238616 A1 | 9/2013 | Rose et al. | |
| 2013/0246170 A1 | 9/2013 | Gross et al. | |
| 2013/0251233 A1 | 9/2013 | Yang et al. | |
| 2013/0262527 A1 | 10/2013 | Hunter et al. | |
| 2013/0263019 A1 | 10/2013 | Castellanos et al. | |
| 2013/0267207 A1 | 10/2013 | Hao et al. | |
| 2013/0268520 A1 | 10/2013 | Fisher et al. | |
| 2013/0279757 A1 | 10/2013 | Kephart | |
| 2013/0282696 A1 | 10/2013 | John et al. | |
| 2013/0290011 A1 | 10/2013 | Lynn et al. | |
| 2013/0290825 A1 | 10/2013 | Arndt et al. | |
| 2013/0297619 A1 | 11/2013 | Chandrasekaran et al. | |
| 2013/0311375 A1 | 11/2013 | Priebatsch | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |
| 2014/0040371 A1 | 2/2014 | Guervich et al. | |
| 2014/0047319 A1 | 2/2014 | Eberlein | |
| 2014/0047357 A1 | 2/2014 | Alfaro et al. | |
| 2014/0059038 A1 | 2/2014 | Mcpherson et al. | |
| 2014/0067611 A1 | 3/2014 | Adachi et al. | |
| 2014/0068487 A1 | 3/2014 | Steiger et al. | |
| 2014/0074855 A1 | 3/2014 | Zhao et al. | |
| 2014/0095273 A1 | 4/2014 | Tang et al. | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0129261 A1 | 5/2014 | Bothwell et al. | |
| 2014/0149436 A1 | 5/2014 | Bahrami et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1 | 7/2014 | Ellis et al. | |
| 2014/0214579 A1 | 7/2014 | Shen et al. | |
| 2014/0222521 A1 | 8/2014 | Chait | |
| 2014/0244388 A1 | 8/2014 | Manouchehri et al. | |
| 2014/0267294 A1 | 9/2014 | Ma et al. | |
| 2014/0267295 A1 | 9/2014 | Sharma et al. | |
| 2014/0279824 A1 | 9/2014 | Tamayo | |
| 2014/0282370 A1* | 9/2014 | Schaefer | G06F 8/70 717/105 |
| 2014/0310266 A1 | 10/2014 | Greenfield | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0344230 A1 | 11/2014 | Krause et al. | |
| 2015/0019394 A1 | 1/2015 | Unser et al. | |
| 2015/0046870 A1 | 2/2015 | Goldenberg et al. | |
| 2015/0074819 A1* | 3/2015 | Borenstein | G06F 21/6218 726/27 |
| 2015/0089424 A1 | 3/2015 | Duffield et al. | |
| 2015/0100897 A1 | 4/2015 | Sun et al. | |
| 2015/0100907 A1 | 4/2015 | Erenrich et al. | |
| 2015/0134666 A1 | 5/2015 | Gattiker et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178825 A1 | 6/2015 | Huerta et al. | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0213082 A1* | 7/2015 | Frankel | G06F 16/285 707/758 |
| 2015/0227295 A1 | 8/2015 | Meiklejohn et al. | |
| 2015/0309719 A1 | 10/2015 | Ma et al. | |
| 2015/0317342 A1 | 11/2015 | Grossman et al. | |

(56) References Cited

U.S. PATENT DOCUMENTS

| | | |
|---|---|---|
| 2015/0324868 A1 | 11/2015 | Kaftan et al. |
| 2015/0347099 A1 | 12/2015 | Breedvelt-Schouten et al. |
| 2016/0170802 A1* | 6/2016 | Belhekar .............. G06F 9/5011 719/320 |

FOREIGN PATENT DOCUMENTS

| | | | |
|---|---|---|---|
| EP | 1672527 | A2 | 6/2006 |
| EP | 2551799 | A2 | 1/2013 |
| EP | 2560134 | A1 | 2/2013 |
| EP | 2778977 | A1 | 9/2014 |
| EP | 2835745 | A2 | 2/2015 |
| EP | 2835770 | A2 | 2/2015 |
| EP | 2838039 | A2 | 2/2015 |
| EP | 2846241 | A1 | 3/2015 |
| EP | 2851852 | A1 | 3/2015 |
| EP | 2858014 | A2 | 4/2015 |
| EP | 2858018 | A1 | 4/2015 |
| EP | 2863326 | A1 | 4/2015 |
| EP | 2863346 | A1 | 4/2015 |
| EP | 2869211 | A2 | 5/2015 |
| EP | 2884439 | A1 | 6/2015 |
| EP | 2884440 | A1 | 6/2015 |
| EP | 2891992 | A1 | 7/2015 |
| EP | 2911078 | A2 | 8/2015 |
| EP | 2911100 | A1 | 8/2015 |
| EP | 2940603 | A1 | 11/2015 |
| EP | 2940609 | A1 | 11/2015 |
| EP | 3188006 | A1 | 7/2017 |
| GB | 2516155 | A | 1/2015 |
| GB | 2518745 | A | 4/2015 |
| NL | 2012778 | A | 11/2014 |
| NL | 2013306 | A | 2/2015 |
| NZ | 624557 | A | 8/2014 |
| WO | WO-2000009529 | A2 | 2/2000 |
| WO | WO-02065353 | A1 | 8/2002 |
| WO | WO-2005104736 | A2 | 11/2005 |
| WO | WO-2008064207 | A2 | 5/2008 |
| WO | WO-2009061501 | A1 | 5/2009 |
| WO | WO-2010000014 | A1 | 1/2010 |
| WO | WO-2010030913 | A2 | 3/2010 |
| WO | WO-2013010157 | A2 | 1/2013 |
| WO | WO-2013102892 | A1 | 7/2013 |

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.

"A Quick Guide to UniProtKB Swiss-Prot & TrEMBL", UniProt Consortium, Ongoing and future developments at the Universal Protein Resource, (Sep. 2011), 1-2.

"About 80 Minutes: Palantir in a number of parts—Part 6—Graph", http://about80minutes.blogspot.com/2013/03/palantir-in-number-of-parts-part-6-graph.html, (Mar. 21, 2013), 1-7.

"About connecting shapes", Microsoft Office-Visio, [Online] retrieved from the Internet: <http://office.microsoft.com/enus/visio-help/about-connecting-shapes-HP085050369.aspx>, (Aug. 4, 2011), 6 pgs.

"Add and glue connectors with the Connector tool", Microsoft Office-Visio,, [Online] retrieved from the Internet: <http://office.microsoft.com/en-us/visio-help/add-and-glue-connectors-with-the-connector-tool-HA010048532.aspx?CTT =1 >, (Aug. 4, 2011), 1 pg.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"U.S. Appl. No. 12/556,318, Non Final Office Action dated Jul. 2, 2015", 19 pgs.

"U.S. Appl. No. 12/556,318, Notice of Allowance dated Nov. 2, 2015", 8 pgs.

"U.S. Appl. No. 13/247,987, Non Final Office Action dated Apr. 2, 2015", 27 pgs.

"U.S. Appl. No. 13/247,987, Non Final Office Action dated Sep. 22, 2015", 34 pgs.

"U.S. Appl. No. 13/831,199, Final Office Action dated Oct. 6, 2015", 17 pgs.

"U.S. Appl. No. 13/831,199, Non Final Office Action dated May 9, 2016", 12 pgs.

"U.S. Appl. No. 13/831,199, Non Final Office Action dated Jun. 3, 2015", 23 pgs.

"U.S. Appl. No. 13/831,791, Final Office Action dated Aug. 6, 2015", 19 pgs.

"U.S. Appl. No. 13/831,791, Non Final Office Action dated Mar. 4, 2015", 20 pgs.

"U.S. Appl. No. 13/835,688, First Action Interview Pre-Interview Communication dated Jun. 17, 2015", 23 pgs.

"U.S. Appl. No. 13/839,026, Non Final Office Action dated Aug. 4, 2015", 66 pgs.

"U.S. Appl. No. 13/839,026, Restriction Requirement dated Apr. 2, 2015", 5 pgs.

"U.S. Appl. No. 13/917,571, Issue Notification dated Aug. 5, 2014", 1 pg.

"U.S. Appl. No. 14/102,394, Notice of Allowance dated Aug. 25, 2014", 13 pgs.

"U.S. Appl. No. 14/108,187, Notice of Allowance dated Aug. 29, 2014", 8 pgs.

"U.S. Appl. No. 14/134,558, Non Final Office Action dated Oct. 7, 2015", 9 pgs.

"U.S. Appl. No. 14/148,568, Final Office Action dated Oct. 22, 2014", 32 pgs.

"U.S. Appl. No. 14/148,568, Non Final Office Action dated Mar. 26, 2015", 7 pgs.

"U.S. Appl. No. 14/148,568, Notice of Allowance dated Aug. 26, 2015", 75 pgs.

"U.S. Appl. No. 14/192,767, Notice of Allowance dated Dec. 16, 2014", 9 pgs.

"U.S. Appl. No. 14/196,814, Non Final Office Action dated May 5, 2015", 24 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Final Office Action dated Feb. 11, 2015", 30 pgs.

"U.S. Appl. No. 14/225,160, First Action Interview Pre-Interview Communication dated Jul. 29, 2014", 19 pgs.

"U.S. Appl. No. 14/225,160, First Action Interview Pre-Interview Communication dated Oct. 22, 2014", 6 pgs.

"U.S. Appl. No. 14/225,160, Non Final Office Action dated Aug. 12, 2015", 23 pgs.

"U.S. Appl. No. 14/268,964, First Action Interview Pre-Interview Communication dated Sep. 3, 2014", 13 pgs.

"U.S. Appl. No. 14/268,964, Notice of Allowance dated Dec. 3, 2014", 13 pgs.

"U.S. Appl. No. 14/289,596, Advisory Action dated Apr. 30, 2015", 3 pgs.

"U.S. Appl. No. 14/289,596, Final Office Action dated Jan. 26, 2015", 38 pgs.

"U.S. Appl. No. 14/289,596, First Action Interview Pre-Interview Communication dated Jul. 18, 2014", 4 pgs.

(56) References Cited

OTHER PUBLICATIONS

"U.S. Appl. No. 14/289,599, Advisory Action dated Sep. 4, 2015", 24 pgs.
"U.S. Appl. No. 14/289,599, Final Office Action dated May 29, 2015", 8 pgs.
"U.S. Appl. No. 14/289,599, First Action Interview Pre-Interview Communication dated Jul. 22, 2014", 5 pgs.
"U.S. Appl. No. 14/294,098, Final Office Action dated Nov. 6, 2014", 22 pgs.
"U.S. Appl. No. 14/294,098, First Action Interview Pre-Interview Communication dated Aug. 15, 2014", 17 pgs.
"U.S. Appl. No. 14/294,098, Notice of Allowance dated Dec. 29, 2014", 9 pgs.
"U.S. Appl. No. 14/306,138, Examiner Interview Summary dated Dec. 3, 2015", 3 pgs.
"U.S. Appl. No. 14/306,138, Final Office Action dated Feb. 18, 2015", 17 pgs.
"U.S. Appl. No. 14/306,138, Final Office Action dated Sep. 15, 2015", 31 pgs.
"U.S. Appl. No. 14/306,138, First Action Interview Pre-Interview Communication dated Sep. 23, 2014", 5 pgs.
"U.S. Appl. No. 14/306,138, Non Final Office Action dated May 26, 2015", 13 pgs.
"U.S. Appl. No. 14/306,147, Final Office Action dated Feb. 19, 2015", 15 pgs.
"U.S. Appl. No. 14/306,147, First Action Interview—Pre-Interview Communication dated Sep. 9, 2014", 6 pgs.
"U.S. Appl. No. 14/306,147, Non Final Office Action dated Aug. 7, 2015", 17 pgs.
"U.S. Appl. No. 14/306,154, Advisory Action dated May 15, 2015", 3 pgs.
"U.S. Appl. No. 14/306,154, Final Office Action dated Mar. 11, 2015", 12 pgs.
"U.S. Appl. No. 14/306,154, Final Office Action dated Nov. 16, 2015", 14 pgs.
"U.S. Appl. No. 14/306,154, First Action Interview Pre-Interview Communication dated Sep. 9, 2014", 4 pgs.
"U.S. Appl. No. 14/306,154, Non Final Office Action dated Jul. 6, 2015", 22 pgs.
"U.S. Appl. No. 14/319,765, Advisory Action dated Sep. 10, 2015", 3 pgs.
"U.S. Appl. No. 14/319,765, Final Office Action dated Jun. 16, 2015", 37 pgs.
"U.S. Appl. No. 14/319,765, First Action Interview Pre-Interview Communication dated Feb. 4, 2015", 3 pgs.
"U.S. Appl. No. 14/319,765, First Action Interview Pre-Interview Communication dated Nov. 25, 2014", 4 pgs.
"U.S. Appl. No. 14/323,935, First Action Interview Pre-Interview Communication dated Mar. 31, 2015", 6 pgs.
"U.S. Appl. No. 14/323,935, First Action Interview Pre-Interview Communication dated Nov. 28, 2014", 4 pgs.
"U.S. Appl. No. 14/323,935, Non Final Office Action dated Jun. 22, 2015", 18 pgs.
"U.S. Appl. No. 14/326,738, Final Office Action dated Jul. 31, 2015", 5 pgs.
"U.S. Appl. No. 14/326,738, First Action Interview Pre-Interview Communication dated Mar. 31, 2015", 6 pgs.
"U.S. Appl. No. 14/326,738, First Action Interview Pre-Interview Communication dated Dec. 2, 2014", 5 pgs.
"U.S. Appl. No. 14/326,738, Notice of Allowance dated Nov. 18, 2015", 13 pgs.
"U.S. Appl. No. 14/473,552, Examiner Interview Summary dated Feb. 24, 2015", 21 pgs.
"U.S. Appl. No. 14/473,552, Notice of Allowance dated Jul. 24, 2015", 8 pgs.
"U.S. Appl. No. 14/473,860, Notice of Allowance dated Jan. 5, 2015", 13 pgs.
"U.S. Appl. No. 14/486,991, Non Final Office Action dated Mar. 10, 2015", 23 pgs.
"U.S. Appl. No. 14/486,991, Notice of Allowance dated May 1, 2015", 5 pgs.
"U.S. Appl. No. 14/490,612, Final Office Action dated Aug. 18, 2015", 71 pgs.
"U.S. Appl. No. 14/504,103, First Action Interview Pre-Interview Communication dated Feb. 5, 2015", 22 pgs.
"U.S. Appl. No. 14/504,103, First Action Interview Pre-Interview Communication dated Mar. 31, 2015", 9 pgs.
"U.S. Appl. No. 14/504,103, Notice of Allowance dated May 18, 2015", 18 pgs.
"U.S. Appl. No. 14/579,752, Final Office Action dated Aug. 19, 2015", 35 pgs.
"U.S. Appl. No. 14/579,752, First Action Interview Pre-Interview Communication dated May 26, 2015", 24 pgs.
"U.S. Appl. No. 14/616,080, Notice of Allowance dated Apr. 2, 2015", 34 pgs.
"U.S. Appl. No. 14/631,633, First Action Interview Pre-Interview Communication dated Sep. 10, 2015", 5 pgs.
"U.S. Appl. No. 14/639,606, Final Office Action dated Oct. 16, 2015", 54 pgs.
"U.S. Appl. No. 14/639,606, First Action Interview Pre-Interview Communication dated May 18, 2015", 9 pgs.
"U.S. Appl. No. 14/639,606, First Action Interview Pre-Interview Communication dated Jul. 24, 2015", 9 pgs.
"U.S. Appl. No. 14/726,353, First Action Interview Pre-Interview Communication dated Sep. 10, 2015", 31 pgs.
"U.S. Appl. No. 14/813,749, Non Final Office Action dated Sep. 28, 2015", 22 pgs.
"U.S. Appl. No. 15/139,793, Notice of Allowance dated Nov. 18, 2016", 25 pgs.
"Australian Application Serial No. 2014201511, Office Action dated Feb. 27, 2015", 2 pgs.
"Australian Application Serial No. 2014202442, Office Action dated Mar. 19, 2015", 5 pgs.
"Australian Application Serial No. 2014210604, Office Action dated Jun. 5, 2015", 3 pgs.
"Australian Application Serial No. 2014210614, Office Action dated Jun. 5, 2015", 5 pgs.
"Australian Application Serial No. 2014250678, Patent Examination Report dated Jun. 17, 2015", 2 pgs.
"Bug 18726—[feature] Long-click means of invoking contextual menus not supported", Bugzilla©Mozilla, [Online] retrieved from the internet: <http://bugzilla.mozilla.org/show_bug.cgi?id=18726>, (Jun. 13, 2013), 11 pgs.
"Chapter 2: IBM InfoSphere DataStage stages", IBM Corp; Modification 0 of IBM Information Server, Version 8, Release 1, 1st Edition, (2008), 35-137.
"E-Security Begins with Sound Security Policies", Symantec Corporation; Symantec Enterprise Security, (Jun. 2001), 12 pgs.
"European Application Serial No. 14158861.6, Extended European Search Report dated Jun. 16, 2014", 6 pgs.
"European Application Serial No. 14159464.8, Extended European Search Report dated Jul. 31, 2014", 7 pgs.
"European Application Serial No. 14159464.8, Non Final Office Action dated Feb. 18, 2016", 6 pgs.
"European Application Serial No. 14159464.8, Non Final Office Action dated Sep. 22, 2014", 2 pgs.
"European Application Serial No. 14180142.3, Extended European Search Report dated Feb. 6, 2015", 7 pgs.
"European Application Serial No. 14180281.9, Extended European Search Report dated Jan. 26, 2015", 8 pgs.
"European Application Serial No. 14180321.3, Extended European Search Report dated Apr. 17, 2015", 9 pgs.
"European Application Serial No. 14180432.8, Extended European Search Report dated Jun. 23, 2015", 8 pgs.
"European Application Serial No. 14186225.0, Extended European Search Report dated Feb. 13, 2015", 6 pgs.
"European Application Serial No. 14187739.9, Extended European Search Report dated Jul. 6, 2015", 9 pgs.
"European Application Serial No. 14187996.5, Extended European Search Report dated Feb. 12, 2015", 7 pgs.
"European Application Serial No. 14189344.6, Non Final Office Action dated Feb. 29, 2016", 9 pgs.

(56) References Cited

OTHER PUBLICATIONS

"European Application Serial No. 14189347.9, Extended European Search Report dated Mar. 4, 2015", 4 pgs.
"European Application Serial No. 14189802.3, Extended European Search Report dated May 11, 2015", 8 pgs.
"European Application Serial No. 14191540.5, Extended European Search Report dated May 27, 2015", 9 pgs.
"European Application Serial No. 14197879.1, Extended European Search Report dated Apr. 28, 2015", 3 pgs.
"European Application Serial No. 14197895.7, Extended European Search Report dated Apr. 28, 2015", 3 pgs.
"European Application Serial No. 14197938.5, Extended European Search Report dated Apr. 28, 2015", 3 pgs.
"European Application Serial No. 14199182.8, Extended European Search Report dated Mar. 13, 2015", 8 pgs.
"European Application Serial No. 15155845.9, Extended European Search Report dated Oct. 6, 2015", 5 pgs.
"European Application Serial No. 15155846.7, Extended European Search Report dated Jul. 8, 2015", 8 pgs.
"European Application Serial No. 15165244.3, Extended European Search Report dated Aug. 27, 2015", 10 pgs.
"European Application Serial No. 15175106.2, Extended European Search Report dated Nov. 5, 2015", 8 pgs.
"European Application Serial No. 15175151.8, Extended European Search Report dated Nov. 25, 2015", 8 pgs.
"European Application Serial No. 15183721.8, Extended European Search Report dated Nov. 23, 2015", 8 pgs.
"European Application Serial No. 16206931.4, Extended European Search Report dated May 22, 2017", w/ English Translation, 10 pgs.
"Federated Database System", From Wikipedia, (Sep. 7, 2013), 1-6.
"Getting Started with VBA in Word 2010", Microsoft Developer Network, [Online] Retrieved from the Internet: <http://msdn.microsoft.com/en-us/library/ff604039%28v=office.14%29.aspx>, (Apr. 2010), 17 pgs.
"GIS-NET 3 Public Department of Regional Planning", Planning & Zoning Information for Unincorporated LA County, [Online] Retrieved from the internet: <http://gis.planning.lacounty.gov/GIS-NET3_Public/Viewer.html>, (Oct. 2, 2013), 1-2.
"Great Britain Application Serial No. 1404457.2, Office Action dated Aug. 14, 2014", 8 pgs.
"Great Britain Application Serial No. 1404574.4, Office Action dated Dec. 18, 2014".
"Great Britain Application Serial No. 1408025.3, Office Action dated Nov. 6, 2014", 3 pgs.
"Great Britain Application Serial No. 1411984.6, Office Action dated Dec. 22, 2014", 6 pgs.
"Great Britain Application Serial No. 1413935.6, Non Final Office Action dated Jan. 27, 2015", 7 pgs.
"Identify—Defintion", Downloaded Jan. 22, 2015, (Jan. 22, 2015), 1 pg.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Map Builder: Rapid Mashup Development Tool for Google and Yahoo Maps!", http://web.archive.org/web/20090626224734/http://www.mapbuilder.net/, (Jul. 20, 2012), 2 pgs.
"Map of San Jose, CA", Retrieved Oct. 2, 2013 from http://maps.google.com, (Oct. 2, 2013), 1 pg.
"Map of San Jose, CA.", Retrieved Oct. 2, 2013 from http://maps.yahoo.com, (Oct. 2, 2013), 1 pg.
"Map of San Jose, CA.", Retrieved Oct. 2, 2013 from http://maps.bing.com, (Oct. 2, 2013), 1 pg.
"Netherlands Application Serial No. 2012437, Netherlands Search Report dated Sep. 18, 2015", W/ English Translation, 7 pgs.
"Netherlands Application Serial No. 2013306, Netherlands Search Report dated Apr. 24, 2015", 8 pgs.
"New Zealand Application Serial No. 622513, Office Action dated Apr. 3, 2014", 2 pgs.
"New Zealand Application Serial No. 622517, Office Action dated Apr. 3, 2014", 3 pgs.
"New Zealand Application Serial No. 624557, Office Action dated May 14, 2014", 2 pgs.
"New Zealand Application Serial No. 627962, Office Action dated Aug. 5, 2014", 2 pgs.
"New Zealand Application Serial No. 628161, First Examination Report dated Aug. 25, 2014", 2 pgs.
"New Zealand Application Serial No. 628263, Office Action dated Aug. 12, 2014", 2 pgs.
"New Zealand Application Serial No. 628495, Office Action dated Aug. 19, 2014", 2 pgs.
"New Zealand Application Serial No. 628585, Office Action dated Aug. 26, 2014", 2 pgs.
"New Zealand Application Serial No. 628840, Office Action dated Aug. 28, 2014", 2 pgs.
"Overlay—Definition", Downloaded Jan. 22, 2015, (Jan. 22, 2015), 1.
"Palantir Labs—Timeline", https://www.youtube.com/watch?v=JCgDW5bru9M, (Oct. 2010), 1 pg.
"Potential Money Laundering Warning Signs", [Online] Retrieved from the internet: <https://web.archive.org/web/20030816090055/http:/finsolinc.com/ANTI-MONEY%20LAUNDERING%20TRAINING%20GUIDES.pdf>, (Accessed 2003), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"The FASTA Program Package", fasta-36.3.4, (Mar. 25, 2011), 1-29.
"Toad for Oracle 11.6, Guide to Using Toad", Quest Software, (2012), 1-162.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
Acklen, Laura, "Absolute Beginner's Guide to Microsoft Office Word 2003", (Dec. 24, 2003), 15-18, 34-41, 308-316.
Ananiev, et al., "The New Modality API", Sun Developer Network (SDN), [Online] retrieved from the internet: <http://web.archive.org/web/20061211011958/http://java.sun.com/developer/technicaiArticles/J2SE/Desktop/javase6/modality/>, (Jan. 21, 2006), 12 pgs.
Bluttman, et al., "Excel Formulas and Functions for Dummies", Wiley Publishing, Inc. (2005), 280, 284-286.
Boyce, Jim, "Microsoft Outlook 2010 Inside Out", https://capdtron.files.wordpress.com/2013/01/outlook-2010-inside_out.pdf, (Aug. 1, 2010), 1-1111.
Butkovic, Asmir, et al., "Using Whois Based Geolocation and Google Maps API for support cybercrime investigations", Recent Advances in Telecommunications and Circuits, 194-200.
Canese, Kathi, et al., "The Bibliographic Database", PubMed: Chapter 2: The NCBI Handbook, (Oct. 2002), 1-10.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chen, et al., "Bringing Order to the Web: Automatically Categorizing Search Results", Proceedings of the SIGCHI conference on Human Factors in Computing Systems, The Hague, The Netherlands, (2000), 145-152.
Chung, Chin-Wan, "Dataplex: An Access to Heterogeneous Distributed Databases", Communications of the ACM, Association for Computing Machinery, Inc., vol. 33, No. 1, (Jan. 1, 1990), 70-80.
Conner, Nancy, "Google Apps: The Missing Manual", (May 1, 2008), 15 pgs.
Delcher, Arthur, et al., "Identifying Bacterial Genes and Endosymbiont DNA with Glimmer", BioInformatics, vol. 23, No. 6, (2007), 673-679.
Dramowicz, Ela, "Retail Trade Area Analysis Using the Huff Model", Directions Magazine,, [Online] retrieved from the Internet: <http://www.directionsmag.com/articles/retail-trade-area-analysis-using-the-huff-model/123411>, (Jul. 2, 2005), 10 pgs.

(56) References Cited

OTHER PUBLICATIONS

Gesher, Ari, "Palantir screenshots in the wild: Swing Sightings", [Online] Retrieved from the internet: <https://www.palantir.com/2007/09/palantir-screenshots/>, (Sep. 11, 2007), 1-12.
Goswami, Gautam, "Quite Writely Said!", Blog: One Brick a Time, [Online]. Retrieved from the Internet: <URL: http://gautamg.wordpress.com/2006/08/21/quite-writely-said/>, (Aug. 2005), 7 pgs.
Griffith, Daniel A, et al., "A Generalized Huff Model", Geographical Analysis, vol. 14, No. 2, (Apr. 1982), 135-144.
Hansen, D., et al., "Analyzing Social Media Networks with NodeXL: Insights from a Connected World", Chapter 4, pp. 53-67 and Chapter 10, pp. 143-164,, (Sep. 2010), 53-67; 143-164.
Hardesty, Larry, "Privacy Challenges: Analysis: It's Surprisingly Easy to Identify Individuals from Credit-Card Metadata", MIT News on Campus and Around the World, MIT News Office, (Jan. 29, 2015), 1-3.
Hibbert, et al., "Prediction of Shopping Behavior Using a Huff Model Within a GIS Framework", (Mar. 18, 2011), 16 pgs.
Hogue, Andrew, et al., "Thresher: Automating the Unwrapping of Semantic Content from the World Wide Web", 14th International Conference on World Wide Web, WWW 2005, (May 2005), 86-95.
Huang, Da Wei, et al., "Systematic and Integrative Analysis of Large Gene Lists Using DAVID Bioinformatics Resources", Nature Protocols, 4.1, (Dec. 2008), 44-57.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Kahan, J., et al., "Annotea: an open RDF Infrastructure for Shared Web Annotations", Computer Networks vol. 39, No. 5, (2002), 589-608.
Kitts, Paul, "Chapter 14: Genome Assembly and Annotation Process", The NCBI Handbook, (Oct. 2002), 1-21.
Levi, Micheal, "Money Laundering Risks and E-Gaming: A European Overview and Assessment", [Online]. Retrieved from the Internet: <URL: http://www.egba.eu/pdf/Levi_Final_Money_Laundering_Risks_egaming%20280909.pdf>, (2009), 30 pgs.
Li, H., et al., "Interactive Multimodal Visual Search on Mobile Device", IEEE Transactions on Multimedia, vol. 15, No. 3, (Apr. 1, 2014), 594-607.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Madden, "Chapter 16: BLAST Sequence Analysis Tool", The NCBI Handbook, (Oct. 2002), 1-15.
Manno, et al., "Introducing Collaboration in Single-user Applications through the Centralized Control Architecture", (2010), 10 pgs.

Manske, "File Saving Dialogs", [Online] retrieved from the internet: <http://www.mozilla.org/editor/ui specs/FileSaveDialogs.html>, (Jan. 20, 1999), 7 pgs.
Mizrachi, Ilene, "Chapter 1: GenBank: The Nucleotide Sequence Database", The NCBI Handbook, (Oct. 2002), 1-14.
Nierman, Andrew, et al., "Evaluating Structural Similarity in XML Documents", U of Michigan, (2002), 1-6.
Nolan, Richard, et al., "MCARTA: A Malicious Code Automated Run-Time Analysis Framework", Homeland Security, 2012 IEEE Conference, (2012), 13-17.
Olanoff, Drew, "Deep Dive with the New Google Maps for Desktop with Google Earth Integration, It's More than Just a Utility", Retrieved from the Internet: http://web.archive.org/web/20130515230641/http://techcrunch.com/2013/05/15/deep-dive-with-the-new-google-maps-for-desktop-with-google-earth-integration-its-more-than-just-a-utility/, (May 15, 2013), 1-6.
Palmas, Gregorio, et al., "An Edge-Bundling Layout for Interactive Parallel Coordinates", 2014 IEEE Pacific Visualization Symposium, (2014), 57-64.
Perdisci, Roberto, et al., "Behavioral Clustering of HTTP-Based Malware and Signature Generation Using Malicious Network Traces", USENIX, (Mar. 18, 2010), 1-14.
Rouse, Margaret, "OLAP Cube", [Online] retrieved from the internet: <http://searchdatamanagement.techtarget.com/definition/OLAP-cube>, (Apr. 28, 2012), 15 pgs.
Shi, Liang, et al., "A Scalable Implementation of Malware Detection Based on Network Connection Behaviors", 2013 International Conference on Cyber-Enabled Distributed Computing and Knowledge Discovery, IEEE, (Oct. 10, 2013), 59-66.
Sigrist, Christian, et al., "Prosite, a Protein Domain Database for Functional Characterization and Annotation", Nucleic Acids Research, vol. 38, (2010), D161-D166.
Sirotkin, Karl, et al., "Chapter 13: The Processing of Biological Sequence Data at NCBI", The NCBI Handbook, (Oct. 2002), 1-11.
Thompson, Mick, "Getting Started with GEO", (Jul. 26, 2011), 3 pgs.
Umagandhi, R., et al., "Search Query Recommendations Using Hybrid User Profile with Query Logs", International Journal of Computer Applications, vol. 80, No. 10, (Oct. 1, 2013), 7-18.
Wright, Brandon, et al., "Palantir Technologies VAST 2010 Challenge Text Records-Investigations into Arms Dealing", (Oct. 29, 2010), 10 pgs.
Xiv, Golem, "A word about banks and the laundering of drug money", http://www.golemxiv.co.uk/2012/08/a-word-about-banks-and-the-laundering-of-drug-money/, (Aug. 18, 2012), 1-21.
Yang, Yudong, "HTML Page Analysis Based on Visual Cues", 2001 IEEE, (2001), 859-864.

* cited by examiner

COMPOSITE GRAPHICAL INTERFACE WITH SHAREABLE DATA-OBJECTS

RELATED APPLICATIONS

This application in a continuation of U.S. patent application Ser. No. 15/139,793, entitled "COMPOSITE GRAPHICAL INTERFACE WITH SHAREABLE DATA-OBJECTS," filed Apr. 27, 2016, which claims the priority benefit of U.S. Provisional Application No. 62/273,320, entitled "COMPOSITE GRAPHICAL INTERFACE WITH SHAREABLE DATA-OBJECTS," filed Dec. 30, 2015, which is hereby incorporated by reference in its entirety.

TECHNICAL FIELD

The subject matter disclosed herein relates to the seamless sharing of data object across multiple application platforms. In particular, example embodiments relate to a composite interface system for generating a composite graphical user interface, and facilitating the sharing of data objects across multiple platforms in a computer network environment, through the composite graphical user interface.

BACKGROUND

In an effort to create specialized and independent products, developers have developed a multitude of unique applications for computer systems, configured to perform a vast array of functions quickly and effectively. However, in pressing for this isolated application development model, some of the advantages of monolithic products and applications have been abandoned—namely, seamless user experience, and data sharing. Applications of computer systems utilize a variety of different file and data types, to perform distinct functions which are often unique to a particular application or system. Additionally, the applications themselves have corresponding user interfaces, with interface elements unique to themselves, and specially configured to facilitate access to certain data types.

As a result, user experience between applications tends to be choppy and jarring, with little to no continuity. Furthermore, data types are often incompatible between applications. These issues lead to a disconnected and problematic user experience.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
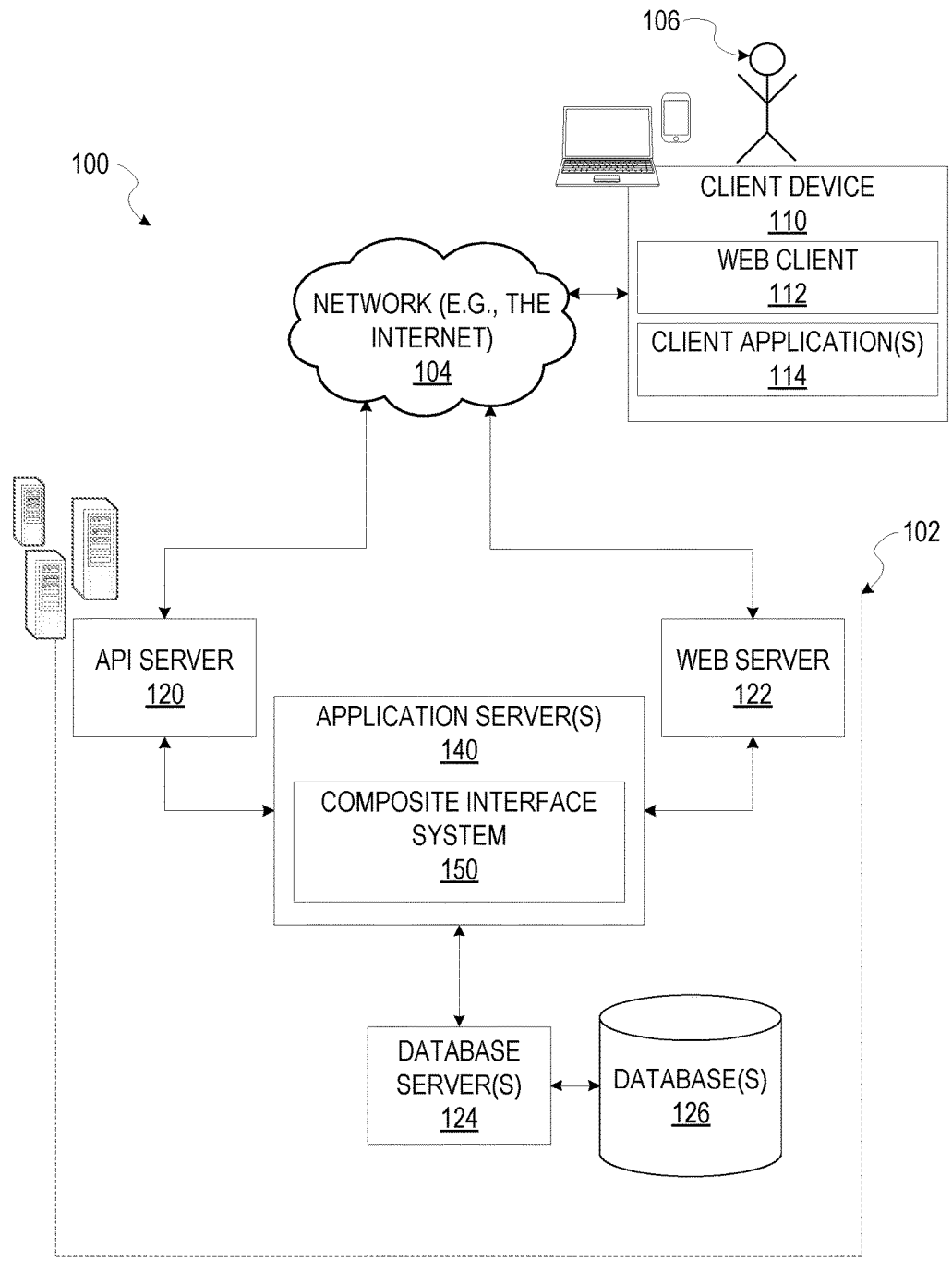
FIG. 1 is a network diagram depicting a network system comprising a group of application servers in communication with a network-based composite interface system configured for receiving references to application data and generating a composite graphical user interface, according to an example embodiment.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based composite interface system, employed for generating a composite graphical user interface (GUI) based on interface elements of referenced applications, to facilitate the sharing of data objects across those applications. A "data object" as used herein may include any item of data or code that can be used by one or more computer programs to execute operations. "Application data" refers to data associated with an application, including, for example, configuration files to configure the parameters and initial settings of applications, as well as application program interfaces (API) associated with the applications. In example embodiments, the data is stored in one or more network databases and are capable of being accessed by applications hosted by servers that share common access to the network database, through the composite graphical user interface. Additional details regarding data objects can be found in U.S. Provisional Application No. 62,272,003 entitled "NETWORK-BASED PERMISSIONING SYSTEM," assigned to the assignee of the instant application, which application is hereby incorporated by reference in its entirety.

Aspects of the present disclosure involve receiving references to application data of applications hosted by the servers. As briefly stated above, the application data includes the set of routines, protocols, and tools for building an application, and the interface of the application. Additionally, the application data may also refer to specific data types associated with the application. Thus, the application data is essentially a description for a computer of how to build a particular application (including its functionality). As a part of the process for generating a composite GUI, the composite interface system receives references to application data of one or more applications at various memory locations (e.g., at both local and third-party servers, as well as cloud servers). In this way, the composite interface system may access the application data of any referenced application in order to configure a composite GUI which includes interface elements of the referenced application (e.g., interface elements and locations of the interface elements within a GUI).

Accordingly, having received the references to the application data, the composite interface system generates and presents a composite GUI at a client device. The composite GUI includes the interface elements of the referenced application, and thereby facilitates the execution of functions and operations performed by the application, without the client device necessarily having direct access or compatibility to the functions of the application itself. In some embodiments, the composite interface system is configured to cause one or more processors of the client device to generate the composite interface.

A portion of the composite GUI generated by the composite interface system includes a sidebar configured to display a graphical element (or elements) representative of the referenced applications. The composite GUI may receive inputs from a client device through the sidebar (e.g., a selection of a graphical element), to launch and cause display of interface elements associated with referenced applications.

Once the composite GUI has been generated and displayed at the client device, the composite interface system receives a selection of a data object from the client device. The data object may be located at a third party server, a local database, or at the client device itself. Having received a selection of the data object, the composite interface system identifies an object type of the data object in order to determine a compatible application to access. After determining the compatible application, the composite interface system access the application data of the compatible application to retrieve the information defining the interface of the application, and causes display of the interface elements of the application within the composite GUI. Thus, a user of the client device may have access to interfaces and functionality of multiple applications through a single composite GUI.

In some embodiments, in order to facilitate sharing of data objects between applications, the composite interface system employs a method of creating and storing artifacts which reference individual data objects of the application (or applications) referenced to the composite GUI. Artifacts are structured and accessed depending on what the base application specifies. An artifact is a reference to a particular data object (or instance of a data object). For example, the referenced application has a data object associated with it, and the data object itself has a number of data attributes surrounding it. The data attributes include, for example, user permissions, a data type identifier, a search instance identifier, a source identifier, and a specific ID of the data object itself.

Having received a selection of a particular data object, the composite interface system creates an artifact referencing the data object. The artifact includes metadata associated with the data object, and formatted by the composite interface system. For example, the composite interface system may include an artifact repository for the discovery, organization, and collection of artifacts, to enable collaborative project development by facilitating the creation and sharing of projects comprising one or more artifacts.

In some example embodiments, the composite interface system provides a publish-subscribe type messaging service, where users may define projects within the composite graphical user interface by selecting one or more artifacts to include in a project, and automatically distribute the project to groups of subscribers. For example, a user of the client device may search the set of artifacts displayed at the client device via a search field within the composite GUI. The composite interface system may then remove at least a portion of artifacts from the set of artifacts based on the search, leaving a presentation of only relevant artifacts. The user may then select one or more artifacts from among the remaining artifacts to assign to a project. Having defined a project, the user may then distribute the project to a subscriber or group of subscribers.

FIG. 1 is a network diagram illustrating a network environment 100 suitable for operating a composite interface system 150. A networked system 102 provides server-side functionality, via a network 104 (e.g., an intranet, the Internet or a Wide Area Network (WAN)), to one or more clients such as the client device 110. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the composite interface system 150. The application servers 140 are, in turn, shown to be coupled to one or more database servers 124 that facilitate access to one or more databases 126.

A composite interface system 150 facilitates the creation of composite GUI and sharable artifacts for the networked system 102. For example, the composite interface system 150 is configured to receive references to application data from a client device 110, and generate a composite GUI based on the referenced application data.

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the presentation platform 104 over the network 106.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the presentation platform 102.

Turning specifically to the networked system 102, a web server 122 is coupled to (e.g., via wired or wireless interfaces), and provides web interfaces to, an application server 140. In some embodiments, the composite interface system 150 runs and executes on the application server 140, while in other embodiments, the application server 140 provides the client device 110 with a set of instructions (e.g., computer-readable code) that causes the web client 112 and the client application 114 of the client device 110 to execute and run the composite interface system 150.

Figure 2:
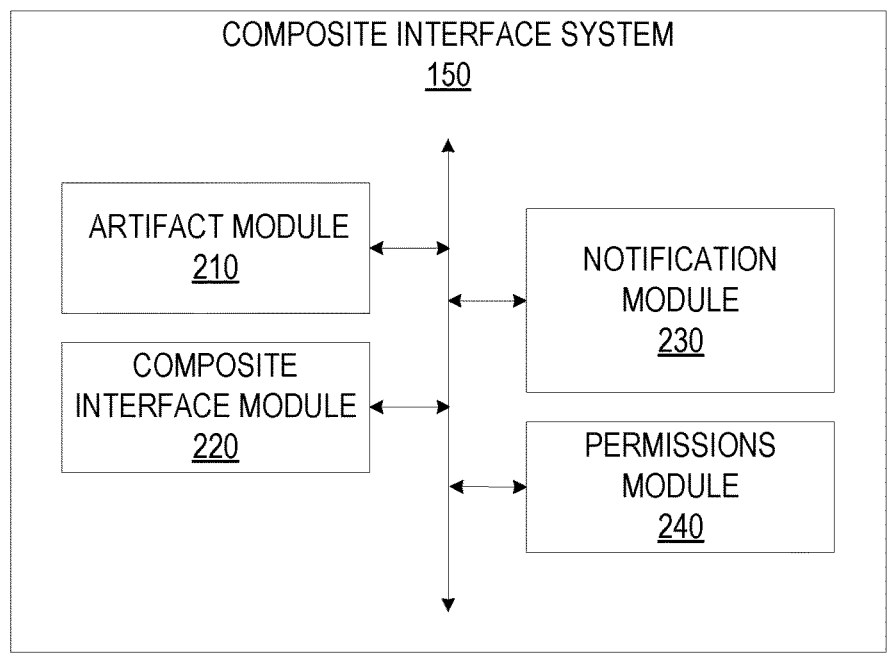
FIG. 2 is a block diagram illustrating various components of the composite interface system, which is provided as part of the network system, consistent with some embodiments.

FIG. 2 is a block diagram illustrating various components of the composite interface system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the composite interface system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, one or more of the various functional components depicted in FIG. 2 may reside on a single computer (e.g., a laptop, client device 110), or may be distributed across several computers in various arrangements such as cloud-based architectures. In some embodiments, modules of the composite interface system 150 may be distributed between the client device 110 and application server 140. Moreover, it shall be appreciated that while the functional components (e.g., modules) of FIG. 2 are discussed in the singular sense, in other embodiments, multiple instances of one or more of the modules may be employed.

The composite interface system 150 is shown as including an artifact module 210, a composite interface module 220, a notification module 230, and a permissions module 240, all configured to communicate with each other (e.g., via a bus, shared memory, a switch, or application programming interfaces (APIs)).

The artifact module 210 facilitates discovery, organization and collection of artifacts and to enable collaborative project development. The artifact module 210 creates artifacts based on metadata of identified data objects (e.g., by the artifact module 210 itself, or via user selection). An artifact is a reference to a data object, crated based on metadata associated with the data object. For example, a data object may have metadata which includes data defining a source of the data object, user permissions of the data object, a unique identifier of the data object, a data type of the data object, and so on. Upon identifying the data object, the artifact module 210 creates an artifact for the data object with the metadata. Having created an artifact, the artifact module 210 may store the artifact within an artifact repository, along with a set of artifacts.

In some embodiments, the artifact module 210 facilitates the creation, editing, and exporting of projects. In the context of this specification, a project is a sharable object comprising one or more artifacts. For example, the artifact module 210 may receive a selection of one or more artifacts through a composite GUI presented at a client device, and assign the selection of artifacts to a project. The artifact module 210 may additionally assign a project identifier (e.g., project ID) to the project.

The composite interface module 220 receives references to application data, extracts interface data defining interface elements from the application data, and generates a composite GUI based on the application data. The application data may include an identifier of the application, a network address of the application, and interface data defining an interface of the application. The composite interface module 220 may reside server side (e.g., within the application server 140), or in some embodiments may reside client side (e.g., within the client device 110), such that the generation of the composite GUI is accomplished by one or more processors of the client device 110.

In some example embodiments, the composite interface module 220 receives a set of references to multiple sets of application data, and in response to receiving an instruction to generate a composite GUI, generates a composite GUI based on the referenced application data. The composite GUI includes a presentation of interface elements from each of the applications associated with the set of application data received. For example, in response to receiving a reference to application data, the composite interface module 220 may generate and cause display of a graphical icon representative of the application data at a location within the composite GUI, such that selection of the graphical icon causes the composite interface module 220 to display the interface elements associated with the selected graphical element.

In further example embodiments, a portion of the composite GUI created by the composite interface module 220 includes a sidebar containing a presentation of the graphical icons associated with each of the referenced applications. For example, the sidebar may include an application icon, such that selection of the application icon results in display of a window which includes an arrangement of the graphical icons. A user may select one or more of the graphical icons from the display window in order to cause display of the corresponding interface elements associated with each referenced application. In some embodiments, the composite interface module 220 communicates the selection of the graphical icon to the artifact module 210, and in response to receiving the selection, the artifact module 210 causes display of an assortment of artifacts referencing data objects associated with the selected graphical icon. The assortment of graphical icons may be presented as a sortable list within the composite GUI.

The notification module 230 provides publish-subscribe type messaging capability, to automatically distribute projects defined by a user within the composite graphical user interface (e.g., by selecting one or more artifacts to include in a project) to a group of subscribers. For example, upon receiving a project definition (i.e., a set of artifacts selected and assigned to the project), the notification module 230 identifies a subscription request from a referenced application. The subscription request may include one or more user identifiers with various network addresses to receive the project (and corresponding artifacts).

The notification module 230 distributes the project to the application. Upon receipt of the project, the application may access the data objects associated the project through the associated artifacts. For example, upon receipt of the projects, the applications may extract the artifacts, and access the data objects associated with the artifacts through the composite interface system 150. In this way, an application itself doesn't have to know how to read a particular data type itself, but can instead rely on the composite interface system 150 to retrieve and access the data based on the artifact.

The permissions module 240 is configured to evaluate and determine user access permissions with respect to data objects referenced by artifacts in the composite interface system 150. The evaluation of user access permissions, in most instances, is triggered by receipt of an access request received via an API from a referenced application supported by the composite interface system 150. The access request includes a data resource identifier corresponding to the data object for which access is being requested, and a user identifier corresponding to the requesting user. In some instances, the access request may further include one or more filters identifying one or more particular operations or sets of operations that are of interest.

Figure 3:
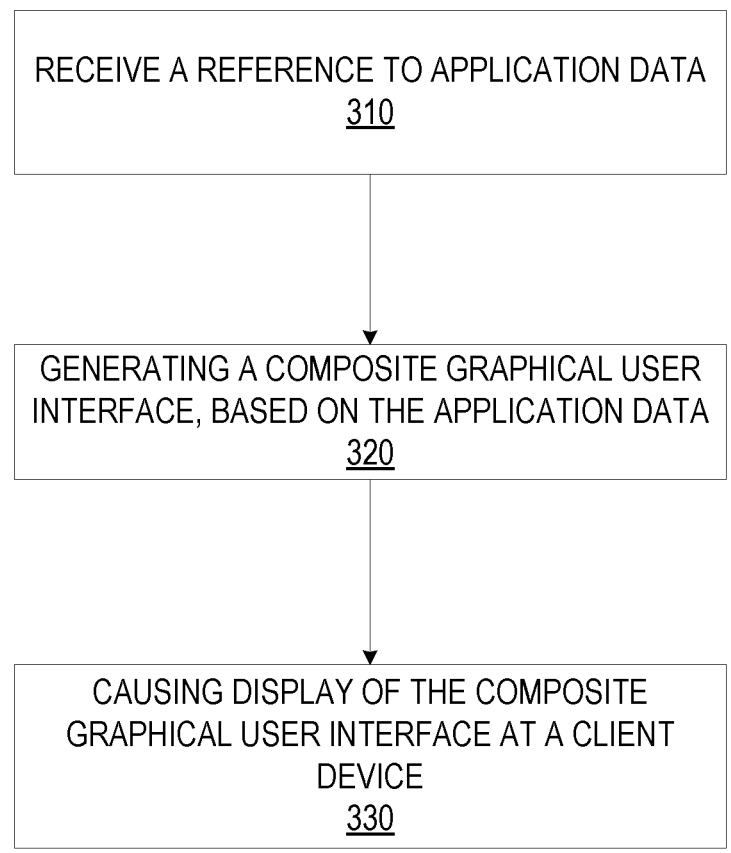
FIG. 3 is a flowchart illustrating a method for generating a composite graphical user interface, according to some example embodiments.

FIG. 3 is a flow-chart illustrating a method 300 for generating and causing display of a composite GUI at a client device, according to some example embodiments. The method 300 is embodied in computer-readable instructions for execution by one or more processors such that the operations of the method 300 are performed in part or in whole by the network-based composite interface system 150; accordingly, the method 300 is described below by way of example with reference thereto. However, it shall be appreciated that at least some of the operations of the method 300 may be deployed on various other hardware configurations, and the method 300 is not intended to be limited to the network-based composite interface system 150.

At operation 310, the composite interface module 220 receives a reference to application data of an application. For example, the composite interface module 220 may provide a set of computer-readable instructions to the client device 110 that causes the client device 110 to display an application reference interface. The user 106 may thereby provide references to application data of applications to be included within the composite GUI generated by the composite interface system 150. In some embodiments, in response to receiving the reference to the application data, the artifact module 210 identifies data objects associated with the referenced application and creates one or more artifacts based on the metadata of the data objects.

At operation 320, the composite interface module 220 receives an instruction to generate a composite GUI, and in response, generates a composite GUI which includes the interface elements of the referenced application. A portion of the composite GUI may include a sidebar in which a graphical icon representing the referenced application data is displayed. In some example embodiments, the sidebar may include an application icon, which a user may select, and in response to receiving a selection of the application icon, the composite interface module 220 may cause display of a window which includes one or more graphical icons associated with referenced applications (e.g., such that selection of the graphical icon results in display of interface elements of a referenced application).

In further example embodiments, the composite GUI includes a presentation of a listing of artifacts associated with the referenced application data. For example, responsive to receiving the reference to the application data, the artifact module 210 creates one or more artifacts based on the referenced application data, and stores the artifacts within an artifact repository (e.g., database 126). Thus, at operation 320, when the composite interface module 220 generates the composite GUI based on the application data, the composite interface module 220 may access the artifact repository to retrieve the set of artifacts associated with the application.

At operation 330, the composite interface module 220 causes display of the composite GUI at a client device (e.g., client device 110). In some embodiments, the permissions module 240 may identify user access permissions associated with a user identifier associated with the client device 110, and cause display of the composite GUI based on the determined user permissions. For example, a user may not have access to an entire set of artifacts based on their user permissions. Upon determining the user permissions of the user identifier, the permissions module 240 removes artifacts which are inaccessible to the user identifier, and presents only those artifacts which the user permissions allow.

Figure 4:
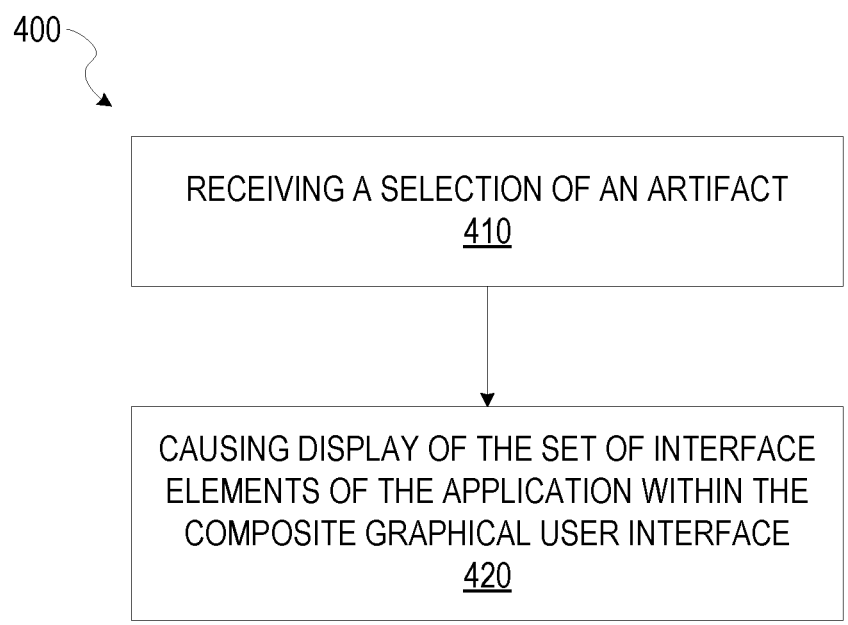
FIG. 4 is a flowchart, illustrating a method for displaying a set of interface elements, consistent with some embodiments.

FIG. 4 is a flow-chart illustrating a method 400 for causing display of a set of interface elements associated with a referenced application based on a selection of an artifact, according to some example embodiments. The method 400 is embodied in computer-readable instructions for execution by one or more processors such that the operations of the method 400 are performed in part or in whole by the network-based composite interface system 150; accordingly, the method 400 is described below by way of example with reference thereto. However, it shall be appreciated that at least some of the operations of the method 400 may be deployed on various other hardware configurations, and the method 400 is not intended to be limited to the network-based composite interface system 150.

At operation 410, the composite interface module 220 receives a selection of an artifact from a client device 110. For example, the composite GUI may include a set of artifacts associated with referenced applications. The set of artifacts may be presented in a user defined sort order (e.g., through a selection of an attribute), based on metadata associated with the artifact.

At operation 420, in response to receiving a selection of the artifact at the client device 110, the composite interface module 220 identifies the referenced application associated with the artifact and causes display of the interface elements of the identified application.

Figure 5:
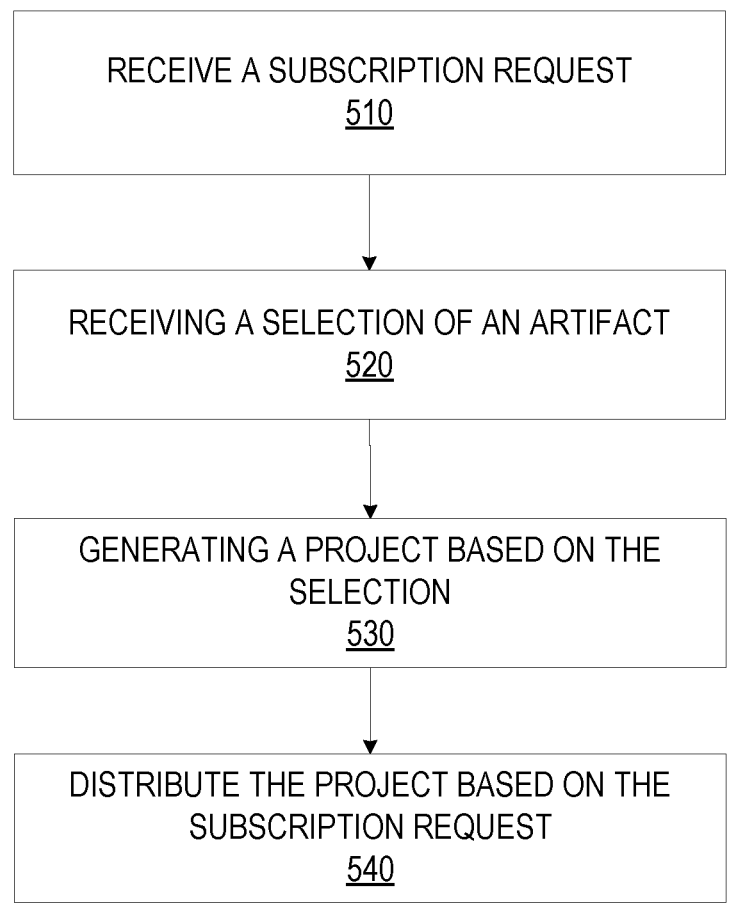
FIG. 5 is a flowchart, illustrating a method of generating and sharing a project, consistent with some embodiments.

FIG. 5 is a flow-chart illustrating a method 500 for distributing a project based on a subscription request, according to some example embodiments. The method 500 is embodied in computer-readable instructions for execution by one or more processors such that the operations of the method 500 are performed in part or in whole by the network-based composite interface system 150; accordingly, the method 500 is described below by way of example with reference thereto. However, it shall be appreciated that at least some of the operations of the method 500 may be deployed on various other hardware configurations, and the method 500 is not intended to be limited to the network-based composite interface system 150.

Many applications or services need long-running calls and a scheme for pushing data to the front-end, and in some cases, backend services may need to communicate with unrelated or incompatible front-ends (e.g. pushing data from one referenced application to another referenced application). The front-end refers to the portion of an application which users interact with, while the back-end refers to the resources of the application configured to service and provide functionality to the front-end. The front-end of one application may not necessarily be compatible with the back-end of another application. The composite GUI generated by the composite interface system 150 therefore provides a general communications channel between the back-end of a referenced application and a front-end of another referenced application, and as such provides a way to address messages to reach the front-end via the use of projects (e.g., sets of artifacts).

At operation 510, the notification module 230 receives a subscription request from a referenced application. The subscription request includes an application identifier of the subscribing application, and a user identifier of a subscribing user. The subscription request may also include a data type.

At operation 520, the artifact module 210 receives a selection of one or more artifacts at the client device 110. For example, a user 106 may select one or more artifacts among a set of artifacts displayed in the composite GUI at the client device 110.

At operation 530, the artifact module 210 receives a request from the client device 110 to assign the selected artifacts to a project. In response to receiving the request to assign the selected artifacts to a project, the artifact module 210 generates a project which includes the selected artifacts.

At operation 540, the notification module 230 distributes the project based on the subscription request, to the referenced application. The referenced application may then notify the subscribing user (e.g., based on the user identifier) of the project. The requesting application may then access then artifacts through the project, and cause display of the data objects associated with the artifacts through the composite GUI.

Figure 6:
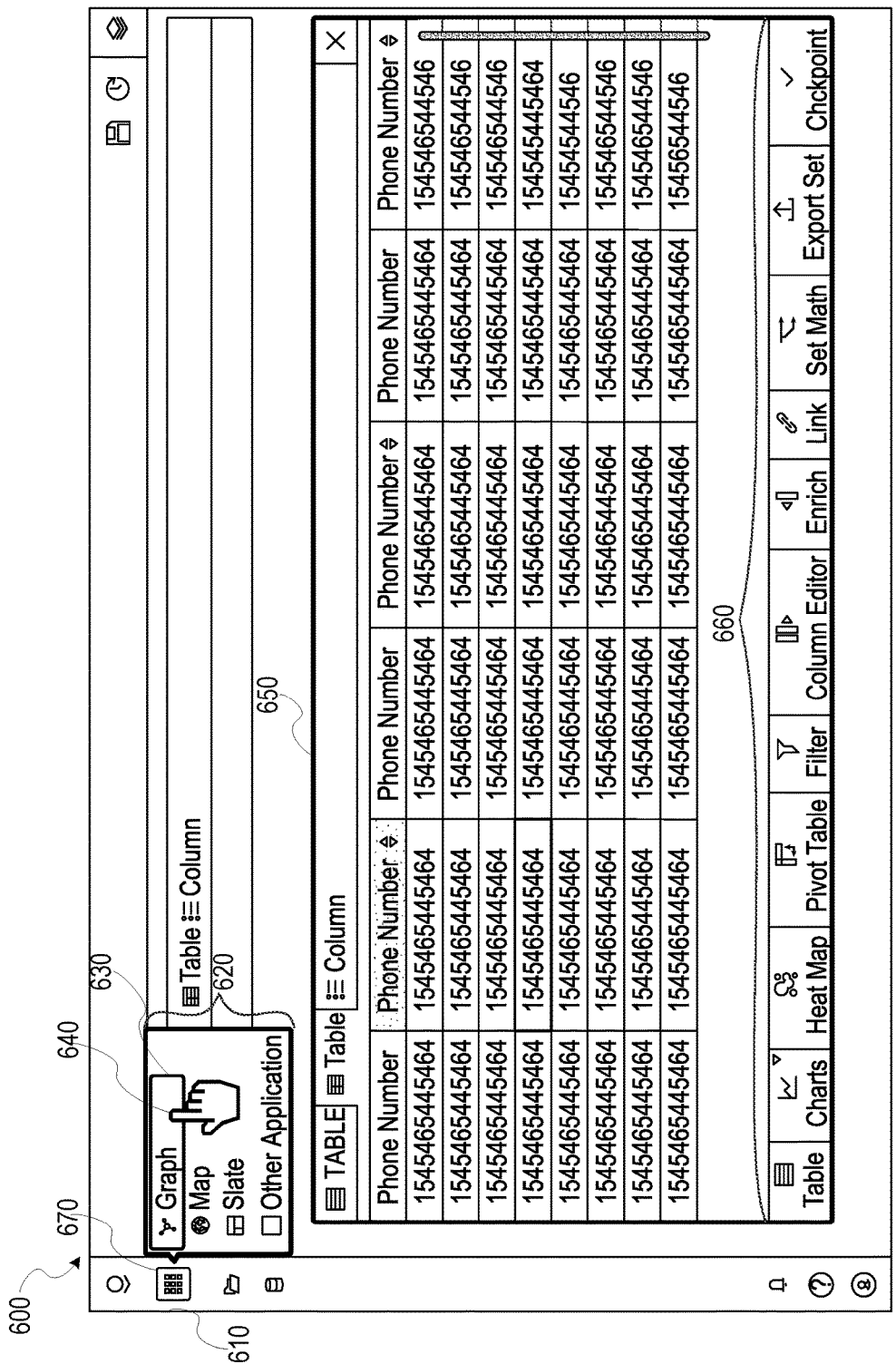
FIG. 6 is an interface diagram illustrating a composite graphical user interface displaying a set of artifacts, consistent with some embodiments.

As an example of the composite GUI generated by the composite interface module 220, FIG. 6 is an interface diagram illustrating a composite GUI 600 for displaying interface elements of a referenced application, according to some example embodiments. As shown, the composite GUI 600 includes a sidebar 610, an application window 620, the application window 620 including a set of graphical icons representing referenced applications (e.g., graphical icon 630), a cursor 640 to make selections within the composite GUI 600, a referenced application interface 650, and a set of interface elements 660, of the referenced application.

For example, in response to receiving the reference to the application data, as in operation 310 of FIG. 3, the composite interface module 220 creates a graphical icon 630 to display within the sidebar 610. As shown in FIG. 6, the sidebar may also include an application icon 670, which a user 106 may select with the cursor 640 to display the application window 620, which includes a set of graphical icons, such as graphical icon 630, representative of referenced applications. Upon receiving a selection of the graphical icon 630, the composite interface module 220 causes display of the associated interface (e.g., interface 650), and its interface elements 660.

Figure 7:
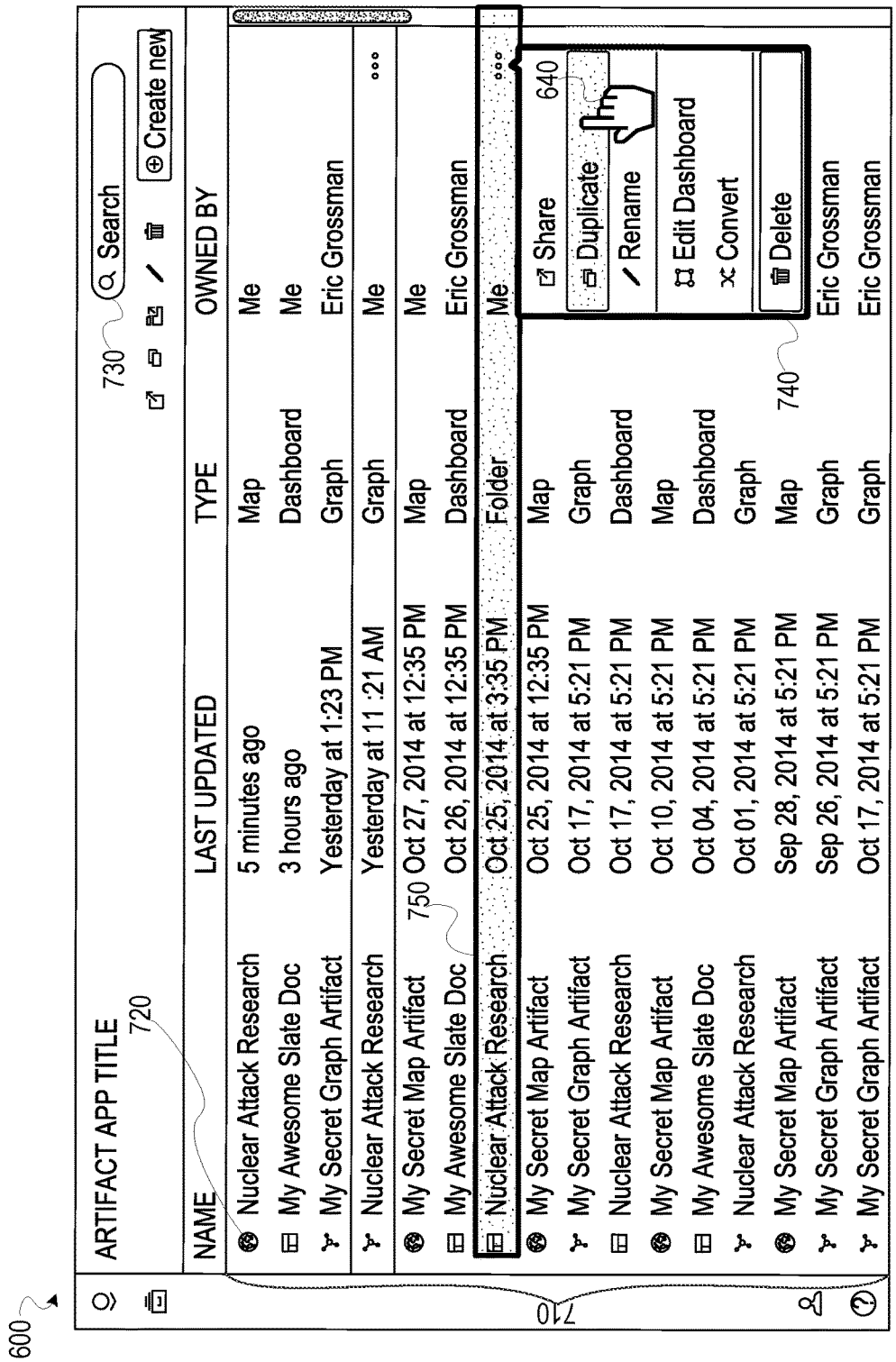
FIG. 7 is an interface diagram illustrating a composite graphical user interface displaying a set of artifacts, consistent with some embodiments.

As an example of the composite GUI generated by the composite interface module 220, FIG. 7 is an interface diagram illustrating the composite GUI 600 for displaying a set of artifacts to create a sharable project, according to some example embodiments. As shown, the composite GUI 600 is shown to include a set of artifacts 710, a graphical icon identifying an application type 720, a search field 730, a project creation window 740, and the cursor 640.

In some embodiments, the composite GUI 600 displays a set of artifacts associated with the referenced applications (e.g., set of artifacts 710). A user 106 may select an artifact (e.g., artifact 750) with the cursor 640. In response to receiving the selection of the artifact 750, the composite GUI 600 causes display of a project creation window 740. The project creation window 740 includes a set of options to share the artifact in a project or to an individual or group of individuals based on a user identifier or set of user identifiers provided by the user 106, or to duplicate, rename, or convert the artifact into another format or data type. For example, as in operation 520 of FIG. 5, a user 106 may select the artifact 750 to assign the artifact 750 to a project, which may then be distributed to a subscriber or subscriber list.

The composite GUI 600 is also shown to include a search field 730. A user 106 may enter a search term into the search field 730, and in response to receiving the search term, the artifact module 210 may present relevant artifacts within the composite GUI 600.

Figure 8:
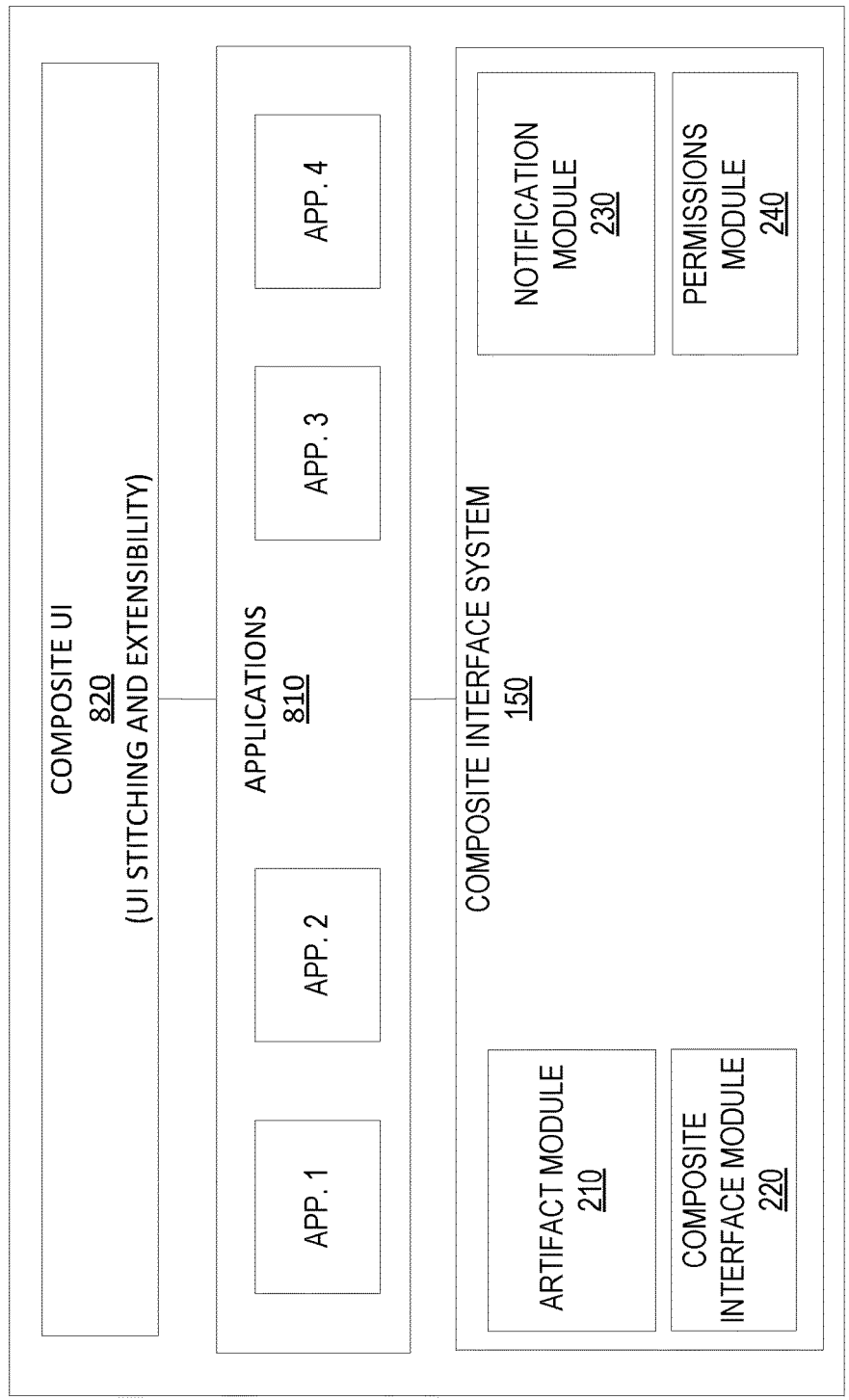
FIG. 8 is an illustration of the various components of a composite user interface, consistent with some embodiments.

FIG. 8 is an illustration of the composite interface system 150, a set of applications 810, and a composite user interface 820, generated by the composite interface system 150, based on the applications 810. The applications 810 may be located at both local (e.g., databases 126) and third-party servers, as well as cloud servers. The composite interface system 150 receives references to the applications 810 (e.g., App. 1, App. 2, App. 3, App. 4), and generate the composite user interface 820, based on interface elements from the set of applications 810.

Figure 9:
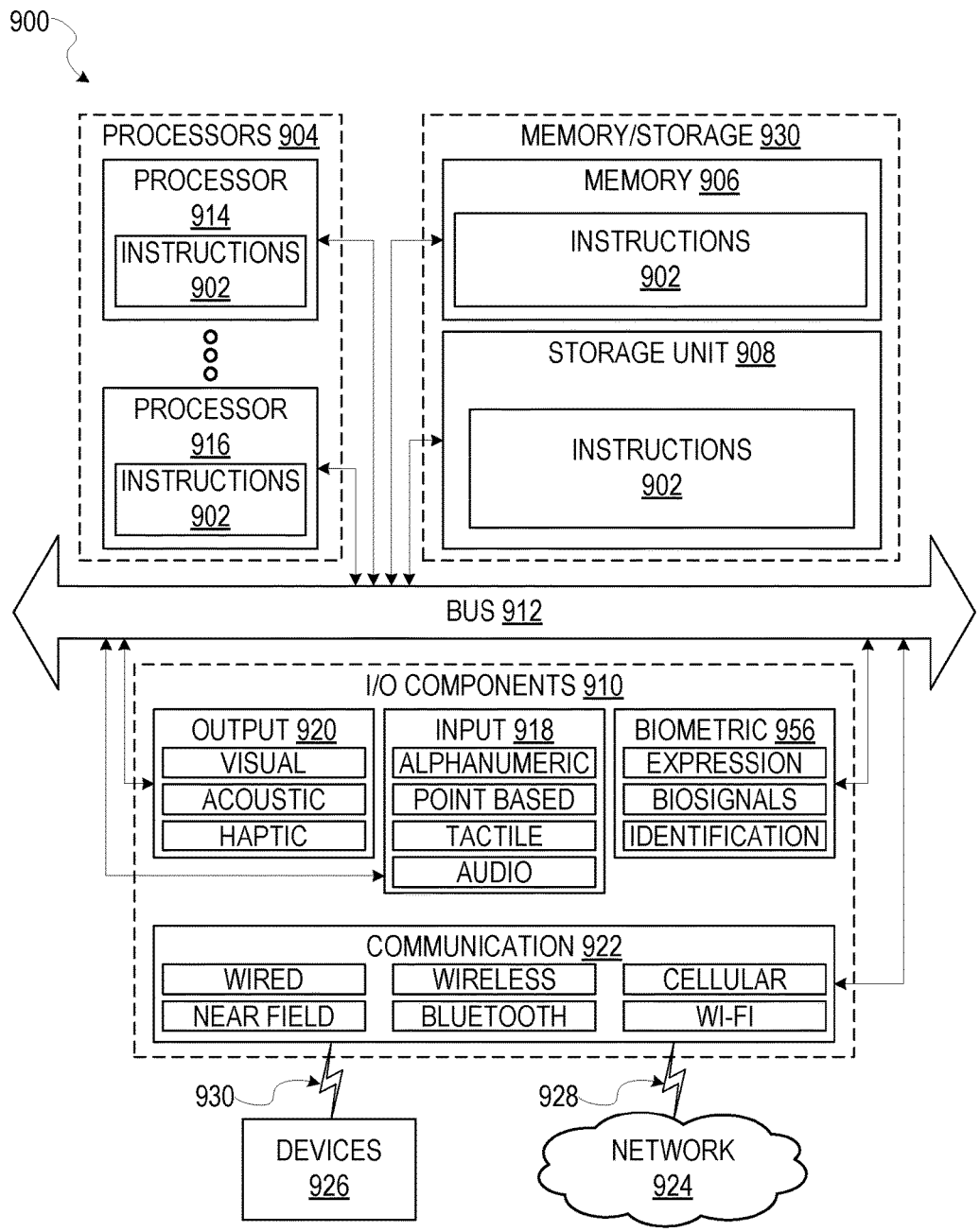
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system within which a set of instructions for causing the machine to perform any one or more of the methodologies discussed herein may be executed. Specifically, FIG. 9 shows a diagrammatic representation of the machine 900 in the example form of a system, within which instructions 902 (e.g., software, a program, an application, an applet, an app, a driver, or other executable code) for causing the machine 900 to perform any one or more of the methodologies discussed herein may be executed. For example, the instructions 902 include executable code that causes the machine 900 to execute the methods 400 and 500. In this way, these instructions 902 transform the general, non-programmed machine into a particular machine programmed to carry out the described and illustrated functions in the manner described herein. The machine 900 may operate as a standalone device or may be coupled (e.g., networked) to other machines.

By way of non-limiting example, the machine 900 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 902, sequentially or otherwise, that specify actions to be taken by machine 900. Further, while only a single machine 900 is illustrated, the term "machine" shall also be taken to include a collection of machines 900 that individually or jointly execute the instructions 902 to perform any one or more of the methodologies discussed herein.

The machine 900 may include processors 904, memory 906, storage unit 908 and I/O components 910, which may be configured to communicate with each other such as via a bus 912. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 914 and processor 916 that may execute instructions 902. The term "processor" is intended to include multi-core processors that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory 906 (e.g., a main memory or other memory storage) and the storage unit 908 are both accessible to the processors 904 such as via the bus 912. The memory 906 and the storage unit 908 store the instructions 902 embodying any one or more of the methodologies or functions described herein. In some embodiments, the databases 126 resides on the storage unit 908. The instructions 902 may also reside, completely or partially, within the memory 906, within the storage unit 908, within at least one of the processors 904 (e.g., within the processor's cache memory), or any suitable combination thereof, during execution thereof by the machine 900. Accordingly, the memory 906, the storage unit 908, and the memory of processors 904 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 902. The term "machine-readable medium" shall also be taken to include any medium, or combination of multiple media, that is capable of storing instructions (e.g., instructions 902) for execution by a machine (e.g., machine 900), such that the instructions, when executed by one or more processors of the machine 900 (e.g., processors 904), cause the machine 900 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine will depend on the type of machine. For example, portable machines such as mobile phones will likely include a touch input device or other such input mechanisms, while a headless server machine will likely not include such a touch input device. It will be appreciated that the I/O components 910 may include many other components that are not specifically shown in FIG. 9. The I/O components 910 are grouped according to functionality merely for simplifying the following discussion and the grouping is in no way limiting. In various example embodiments, the I/O components 910 may include input components 918 and output components 920. The input components 918 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 910 may include communication components 922 operable to couple the machine 900 to a network 924 or devices 926 via coupling 928 and coupling 930, respectively. For example, the communication components 922 may include a network interface component or other suitable device to interface with the network 924. In further examples, communication components 922 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 926 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors of a machine; and
a memory storing instructions that, when executed by at least one processor among the processors, causes the system to perform operations comprising:
  receiving, at a server system, a reference to application data of an application, wherein the application data includes interface elements of the application and a set of instructions to execute a function of the application;
  causing display of a composite graphical user interface (GUI) at a display of a client device, the composite GUI including a sidebar element displayed at a portion of the display of the client device, the sidebar element including a presentation of a graphical icon representative of the application;
  receiving, at the server system, a selection of the graphical element from the client device;
  updating the display of the composite GUI at the client device to include the interface elements of the application, in response to the receiving the selection;
  accessing a data repository associated with the application, the data repository including a data object that comprises data attributes;
  generating an artifact based on the data object at the client device, the artifact comprising a reference to a location of the data object within the data repository; and
  causing display of the artifact with the composite GUI based on at least the data attributes of the data object.

2. The system of claim 1, wherein the instructions cause the system to perform operations further comprising:
causing the client device to perform the function of the application based on the set of instructions.

3. The system of claim 1, wherein the application data indicates a compatible data type, and the instructions cause the system to perform operations further comprising:
  receiving, at the server system, a data object of the compatible data type indicated by the application data;
  determining the data object is of the compatible data type; and
  presenting the data object within the composite GUI based on the set of instructions of the application data.

4. The system of claim 1, wherein the reference is a first reference, the application is a first application, the application data is a first application data, the interface elements are a first set of interface elements, the graphical icon is a first graphical icon, and the set of instructions is a first set of instructions to execute the first application, and the instructions cause the system to perform operations further comprising:
  receiving a second reference to a second application data of a second application, the second application data including a second set of interface elements of the second application and a second set of instructions to execute a second function of the second application;
  updating the sidebar element to include a second graphical icon and the first graphical icon, wherein the second graphical icon represents the second application;
  receiving a selection of the second graphical element from the client device; and
  updating the composite GUI to include the second set of interface elements of the second application.

5. The system of claim 4, wherein the data attributes include a data type identifier of the data object, and the instructions cause the system to perform operation further comprising:
  receiving a selection of the artifact from the client device;
  retrieving the data attributes of the artifact from the data repository, in response to the receiving the selection of the artifact;
  determining a data type of the data object referenced by the artifact based on the data type identifier of the data attributes of the data object; and
  presenting the data object within the composite GUI based on the data type.

6. The system of claim 1, wherein the data attributes include a data type identifier of the data object, an identifier of the data object, and a user permission of the data object.

7. The system of claim 1, wherein the data attributes include a data type identifier of the data object, and the instructions cause the system to perform operation further comprising:
  receiving a request to assign the artifact to a project from the client device;
  receiving a distribution list that includes a set of network addresses of a set of client devices; and
  distributing the project to the set of client devices.

8. A non-transitory machine-readable storage medium comprising instructions that, when executed by one or more processors of a machine, cause the machine to perform operations comprising:
  receiving, at a server system, a reference to application data of an application, wherein the application data includes interface elements of the application and a set of instructions to execute a function of the application;
  causing display of a composite graphical user interface (GUI) at a display of a client device, the composite GUI including a sidebar element displayed at a portion of the display of the client device, the sidebar element including a presentation of a graphical icon representative of the application;

receiving, at the server system, a selection of the graphical element from the client device;

updating the display of the composite GUI at the client device to include the interface elements of the application, in response to the receiving the selection;

accessing a data repository associated with the application, the data repository including a data object that comprises data attributes;

generating an artifact based on the data object at the client device, the artifact comprising a reference to a location of the data object within the data repository; and causing display of the artifact with the composite GUI based on at least the data attributes of the data object.

9. The non-transitory machine-readable storage medium of claim 8, wherein the instructions further comprise:

causing the client device to perform the function of the application based on the set of instructions.

10. The non-transitory machine-readable storage medium of claim 8, wherein the application data indicates a compatible data type, and the instructions further comprise:

receiving, at the server system, a data object of the compatible data type indicated by the application data;

determining the data object is of the compatible data type; and presenting the data object within the composite GUI based on the set of instructions of the application data.

11. The non-transitory machine-readable storage medium of claim 8, wherein the reference is a first reference, the application is a first application, the application data is a first application data, the interface elements are a first set of interface elements, the graphical icon is a first graphical icon, and the set of instructions is a first set of instructions to execute the first application, and the instructions further comprise:

receiving a second reference to a second application data of a second application, the second application data including a second set of interface elements of the second application and a second set of instructions to execute a second function of the second application;

updating the sidebar element to include a second graphical icon and the first graphical icon, wherein the second graphical icon represents the second application;

receiving a selection of the second graphical element from the client device; and updating the composite GUI to include the second set of interface elements of the second application.

12. The non-transitory machine-readable storage medium of claim 8, wherein the data attributes include a data type identifier of the data object, an identifier of the data object, and a user permission of the data object.

13. The non-transitory machine-readable storage medium of claim 8, wherein the data attributes include a data type identifier of the data object, and the instructions further comprise:

receiving a selection of the artifact from the client device;

retrieving the data attributes of the artifact from the data repository, in response to the receiving the selection of the artifact;

determining a data type of the data object referenced by the artifact based on the data type identifier of the data attributes of the data object; and presenting the data object within the composite GUI based on the data type.

14. A method comprising:

receiving, at a server system, a reference to application data of an application, wherein the application data includes interface elements of the application and a set of instructions to execute a function of the application;

causing display of a composite graphical user interface (GUI) at a display of a client device, the composite GUI including a sidebar element displayed at a portion of the display of the client device, the sidebar element including a presentation of a graphical icon representative of the application;

receiving, at the server system, a selection of the graphical element from the client device;

updating the display of the composite GUI at the client device to include the interface elements of the application, in response to the receiving the selection;

accessing a data repository associated with the application, the data repository including a data object that comprises data attributes;

generating an artifact based on the data object at the client device, the artifact comprising a reference to a location of the data object within the data repository; and causing display of the artifact with the composite GUI based on at least the data attributes of the data object.

15. The method of claim 14, wherein the method further comprises:

causing the client device to perform the function of the application based on the set of instructions.

16. The method of claim 14, wherein the application data indicates a compatible data type, and the method further comprises:

receiving, at the server system, a data object of the compatible data type indicated by the application data;

determining the data object is of the compatible data type; and presenting the data object within the composite GUI based on the set of instructions of the application data.

17. The method of claim 14, wherein the reference is a first reference, the application is a first application, the application data is a first application data, the interface elements are a first set of interface elements, the graphical icon is a first graphical icon, and the set of instructions is a first set of instructions to execute the first application, and the method further comprises:

receiving a second reference to a second application data of a second application, the second application data including a second set of interface elements of the second application and a second set of instructions to execute a second function of the second application;

updating the sidebar element to include a second graphical icon and the first graphical icon, wherein the second graphical icon represents the second application;

receiving a selection of the second graphical element from the client device; and updating the composite GUI to include the second set of interface elements of the second application.

* * * * *